(12) United States Patent
Harmsma et al.

(10) Patent No.: US 12,345,916 B2
(45) Date of Patent: Jul. 1, 2025

(54) PHOTONIC INTEGRATED DEVICE FOR CONVERTING A LIGHT SIGNAL INTO SOUND VIA A SOLID PHOTO-ACOUSTIC CONVERTER

(71) Applicant: Nederlandse Organisatie voor toegepast-natuurwetenschappelijk onderzoek TNO, 's-Gravenhage (NL)

(72) Inventors: Peter Johan Harmsma, Vleuten (NL); Paul Louis Maria Joseph Van Neer, Bergschenhoek (NL); Robert Karl Altmann, Abcoude (NL); Daniele Piras, Amsterdam (NL); Maurits Sebastiaan Van Der Heiden, 's-Gravenhage (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 195 days.

(21) Appl. No.: 17/793,243

(22) PCT Filed: Jan. 18, 2021

(86) PCT No.: PCT/NL2021/050025
§ 371 (c)(1),
(2) Date: Jul. 15, 2022

(87) PCT Pub. No.: WO2021/145768
PCT Pub. Date: Jul. 22, 2021

(65) Prior Publication Data
US 2023/0059011 A1    Feb. 23, 2023

(30) Foreign Application Priority Data

Jan. 16, 2020 (EP) .................................. 20152269

(51) Int. Cl.
*G02B 6/12*      (2006.01)
*G02B 6/125*     (2006.01)
*G02F 1/11*      (2006.01)

(52) U.S. Cl.
CPC ......... *G02B 6/12004* (2013.01); *G02B 6/125* (2013.01); *G02F 1/11* (2013.01)

(58) Field of Classification Search
CPC .. G02B 6/1228; G02B 6/125; G02B 6/12004; G02B 6/124; G02B 6/305;
(Continued)

(56) References Cited

U.S. PATENT DOCUMENTS 4,545,253 A * 10/1985 Avicola ................ G02B 6/2821
                                              250/231.19
4,866,681 A *  9/1989 Fertig .................. G01N 21/552
                                              385/12

(Continued)

FOREIGN PATENT DOCUMENTS

| JP | 2016 170025 | * 9/2016 |
| JP | 2016170025 A | 9/2016 |
| WO | 2016051764 A1 | 4/2016 |

*Primary Examiner* — Andrew Jordan
(74) *Attorney, Agent, or Firm* — Banner & Witcoff, Ltd.

(57) ABSTRACT

The photonic integrated device for converting a light signal into sound comprises—a substrate having a substrate surface, an optical waveguide on the substrate surface, a photo-acoustic conversion body, comprising at least one volume of fractionally light absorbing material or formed entirely of fractionally light absorbing material, wherein a width of the photo-acoustic conversion body is greater than a width of the optical waveguide and means for enhancing distribution of light from the optical waveguide over the photo-acoustic conversion body.

18 Claims, 21 Drawing Sheets

(58) Field of Classification Search
CPC .... G02B 6/12002; G02B 6/2934; G02B 6/10; G02B 6/12007; G02B 6/122; G02B 6/136; G02B 6/14; G02B 6/29332; G02B 6/29338; G02B 6/0208; G02B 6/264; G02B 6/32; G02B 6/4286; G02B 6/02061; G02B 6/12; G02B 6/132; G02B 6/2852; G02B 6/30; G02B 6/34; G02B 6/4225; G02B 6/4227; G02B 2006/12097; G02B 2006/12035; G02B 2006/12102; G02B 2006/12123; G02B 2006/12152; G02B 2006/1204; G02B 2006/12061; G02B 2006/12109; G02B 2006/12126; G02B 2006/12142; G02B 2006/12188; G02F 1/11

See application file for complete search history.

(56) References Cited

U.S. PATENT DOCUMENTS

| | | | | | |
|---|---|---|---|---|---|
| 4,903,248 | A * | 2/1990 | Fertig | ................ | G01N 21/1702 356/216 |
| 5,103,456 | A * | 4/1992 | Scifres | ................ | H01S 5/026 372/99 |
| 10,175,158 | B2 * | 1/2019 | Strohm | ................ | G01N 29/46 |
| 10,718,904 | B2 * | 7/2020 | Fathpour | ............ | G02B 6/12004 |
| 11,726,262 | B2 * | 8/2023 | Albrechtsen | ............ | G02B 6/14 385/16 |
| 2002/0127144 | A1 * | 9/2002 | Mehta | ................ | G01N 15/1031 436/164 |
| 2003/0016434 | A1 * | 1/2003 | Torchigin | ................ | G02F 1/125 359/305 |
| 2010/0192669 | A1 * | 8/2010 | Presura | ............. | G01N 21/1702 73/23.3 |
| 2011/0150386 | A1 * | 6/2011 | Dupuis | .................... | G02B 6/10 264/1.24 |
| 2012/0260719 | A1 * | 10/2012 | Schade | ............. | G01N 21/1702 29/25.01 |
| 2013/0277331 | A1 * | 10/2013 | Dupuis | .................. | G02B 6/125 216/24 |
| 2014/0200454 | A1 * | 7/2014 | Li | ........................ | A61B 5/0035 600/443 |
| 2015/0233811 | A1 * | 8/2015 | Strohm | .................. | G01N 15/10 73/601 |
| 2016/0018593 | A1 * | 1/2016 | Tasker | ............... | G02B 6/02395 385/37 |
| 2018/0335365 | A1 * | 11/2018 | Kamei | ..................... | G02B 6/13 |
| 2019/0170935 | A1 * | 6/2019 | Tasker | ................... | G01H 9/004 |
| 2020/0183083 | A1 * | 6/2020 | Tasker | ............... | G02B 6/02095 |
| 2020/0319019 | A1 * | 10/2020 | Westerveld | ........... | G01H 9/004 |
| 2021/0181426 | A1 * | 6/2021 | Fukuda | ............... | G02B 6/34 |
| 2021/0223470 | A1 * | 7/2021 | Tasker | .................. | G02B 6/403 |
| 2023/0054431 | A1 * | 2/2023 | Van Neer | .............. | H04R 1/406 |
| 2023/0055692 | A1 * | 2/2023 | Van Der Heiden | | G01D 5/35335 |
| 2023/0059011 | A1 * | 2/2023 | Harmsma | ............. | G02B 6/125 |
| 2023/0065945 | A1 * | 3/2023 | Van Der Heiden | | G01D 5/35306 |
| 2023/0384520 | A1 * | 11/2023 | Picard | ................... | G02B 6/126 |

* cited by examiner

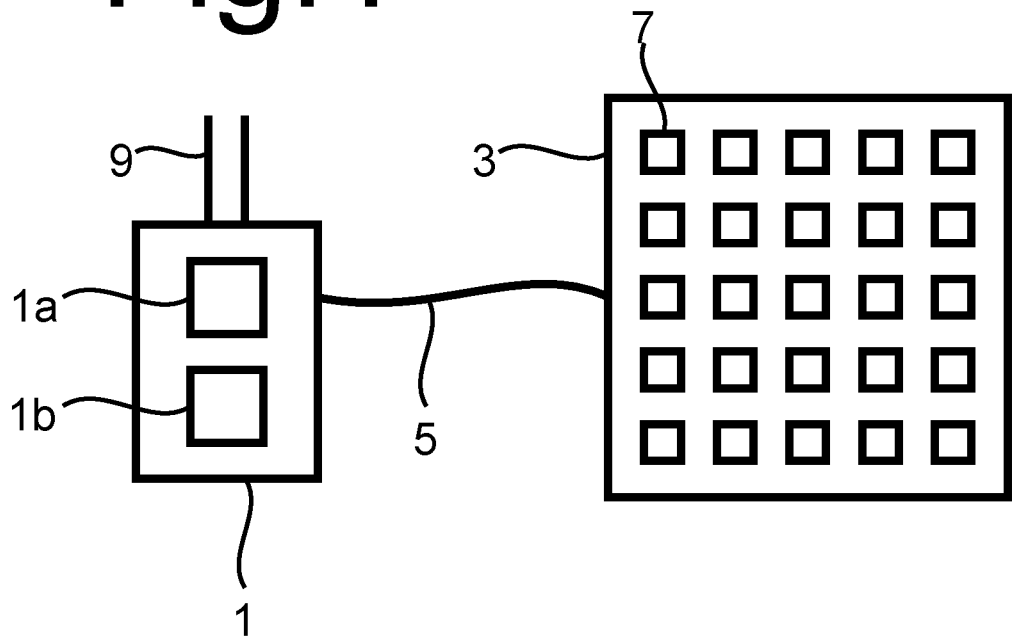
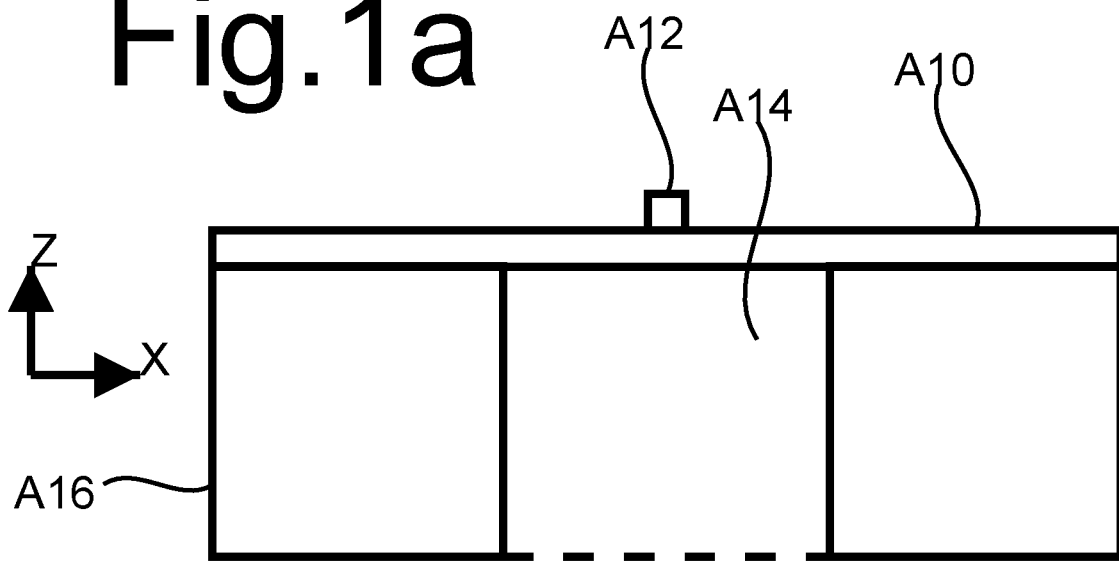

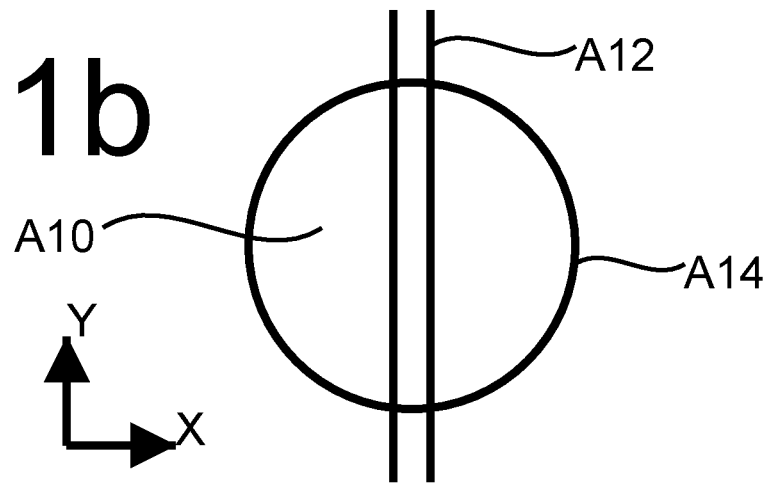
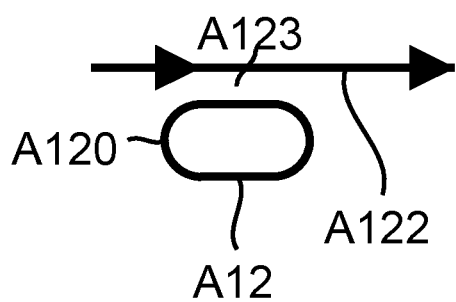
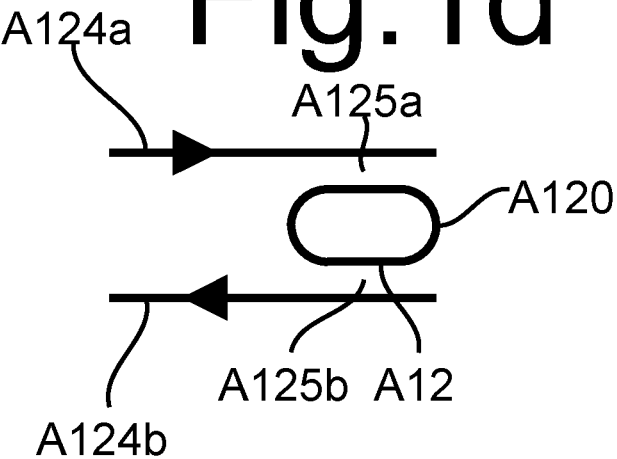

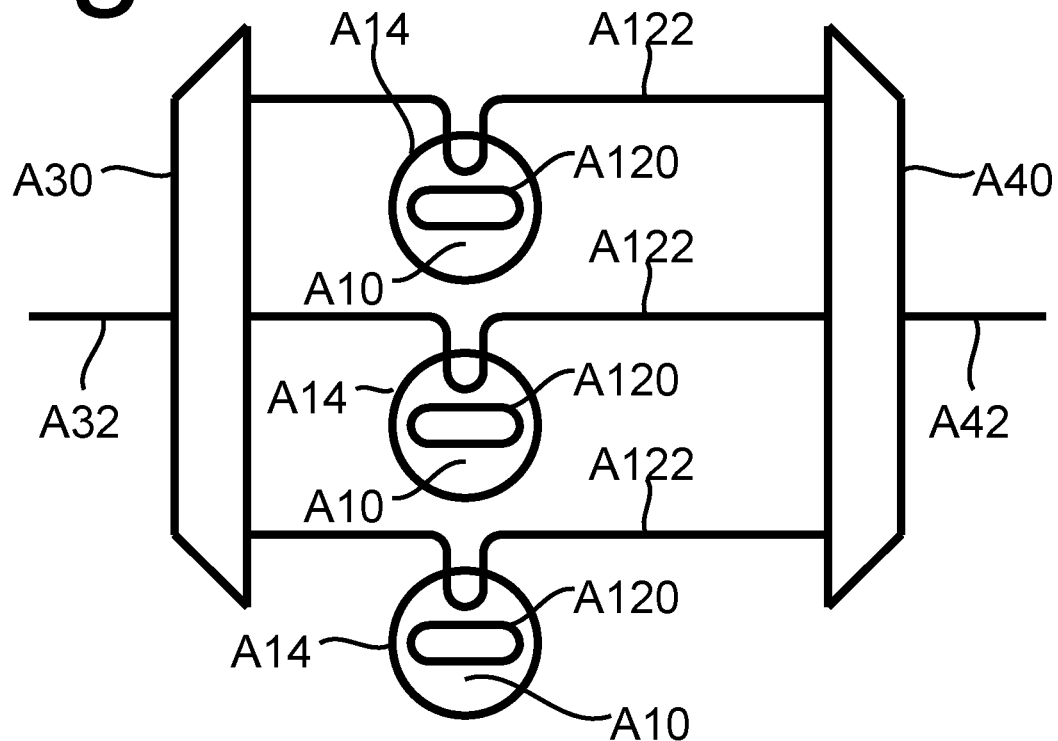
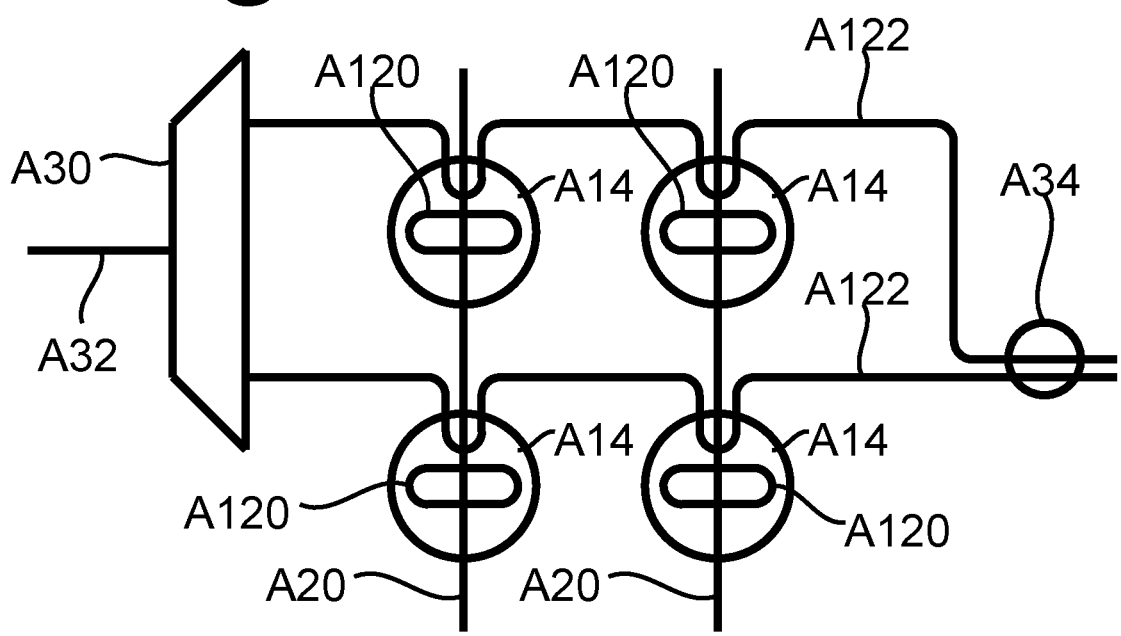

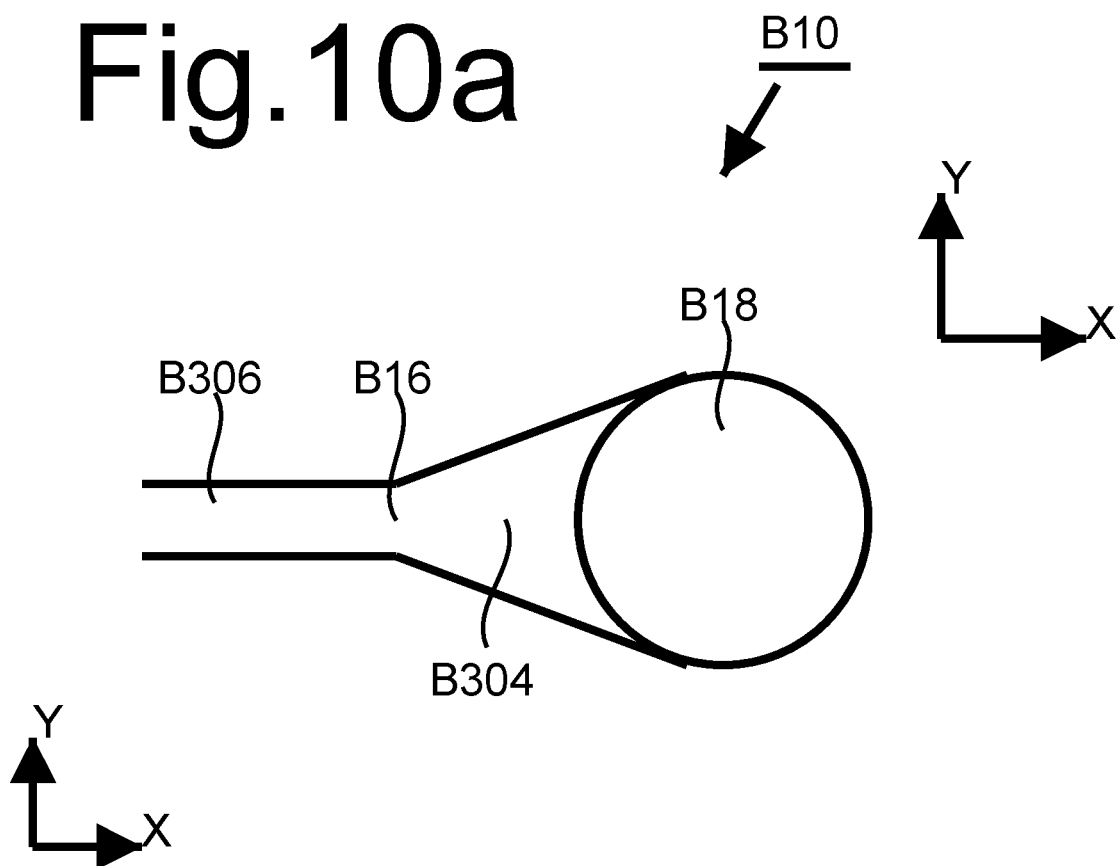
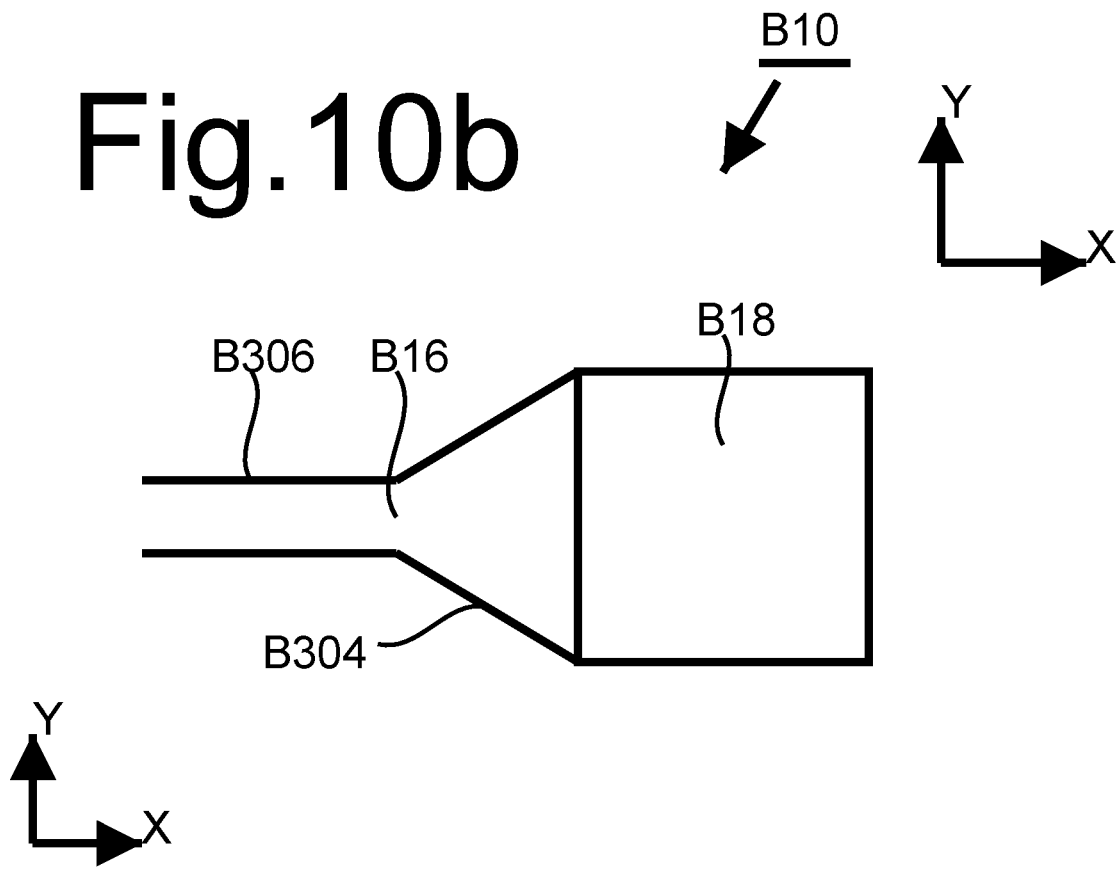

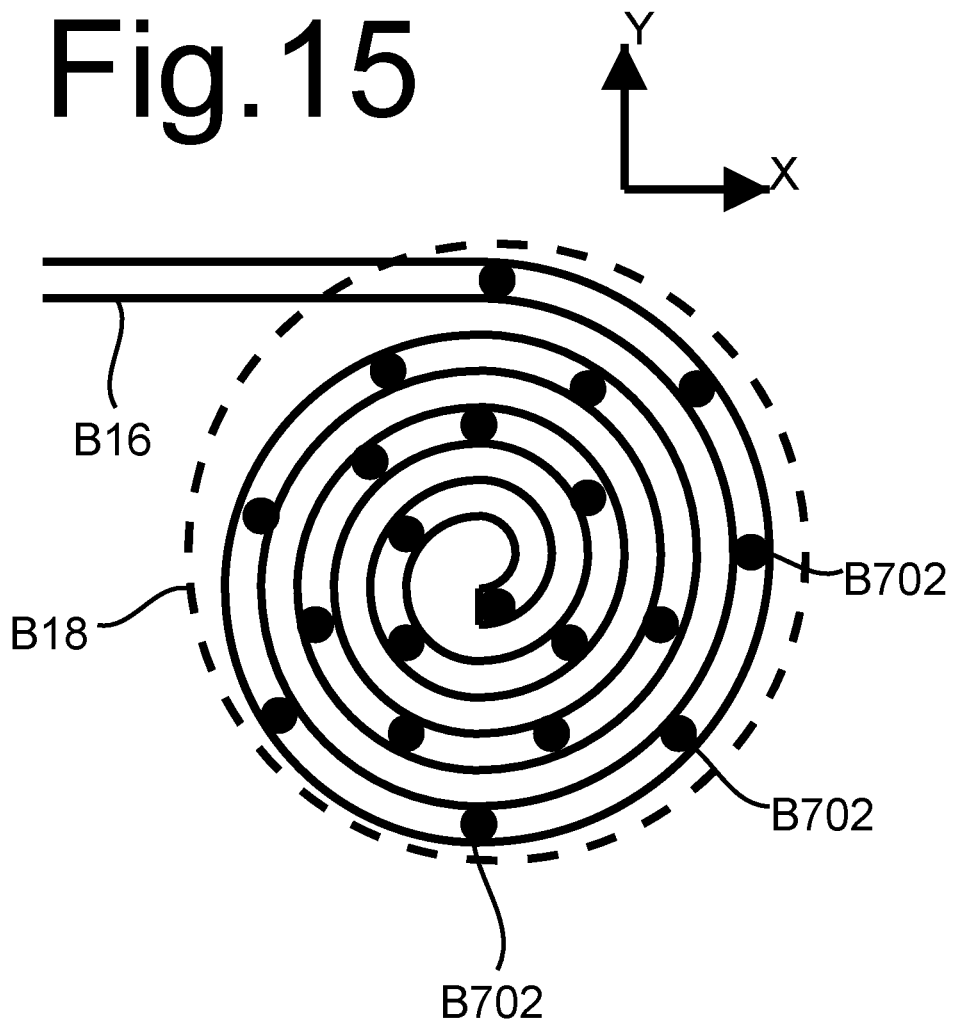

C16  C102  C112  C104

C104
C112
C102
C16
C26
C22

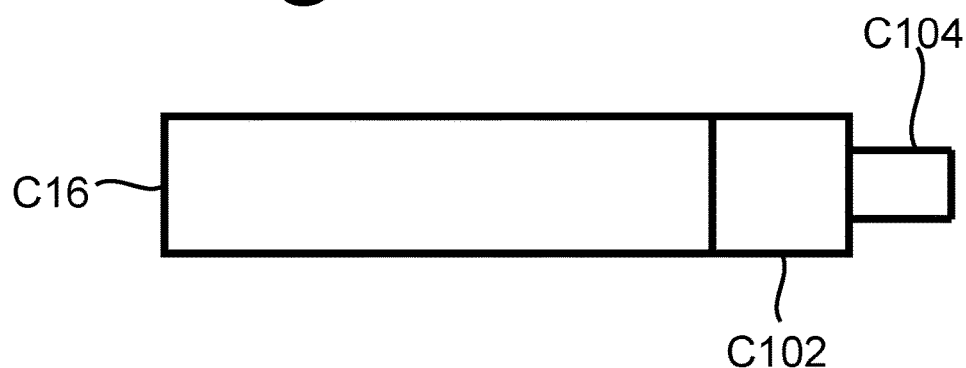
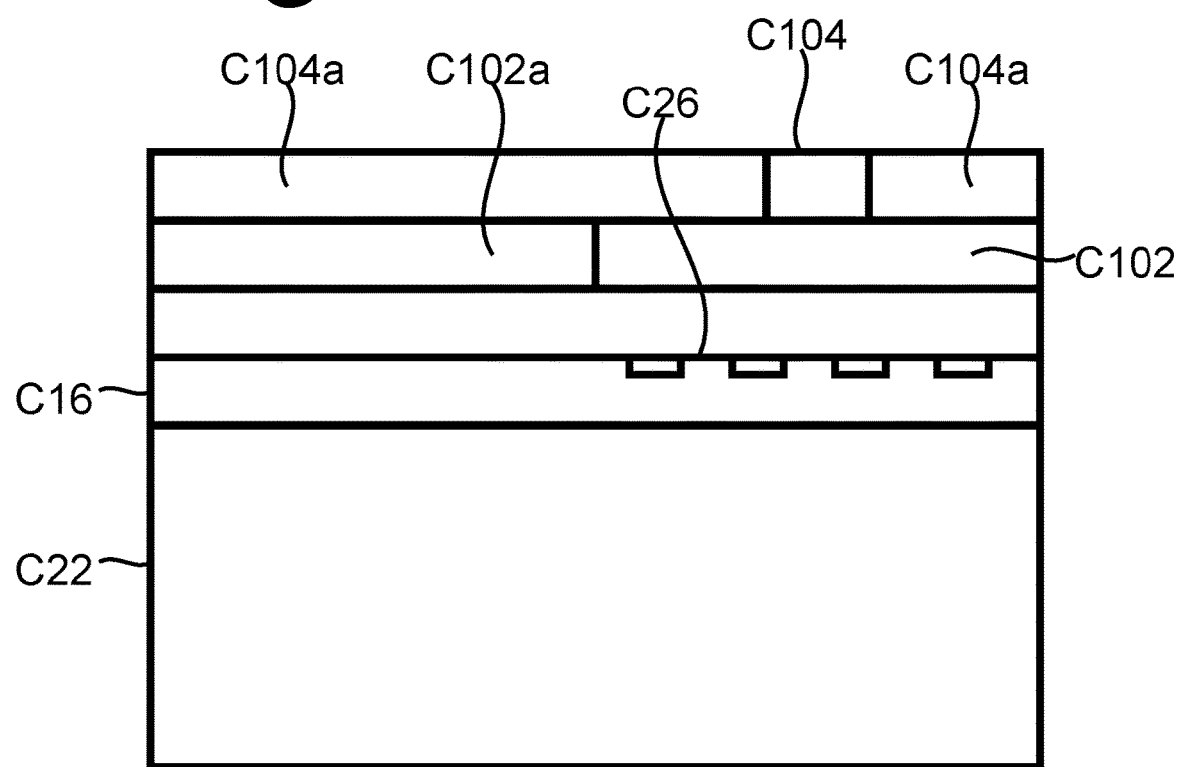

PHOTONIC INTEGRATED DEVICE FOR CONVERTING A LIGHT SIGNAL INTO SOUND VIA A SOLID PHOTO-ACOUSTIC CONVERTER

CROSS-REFERENCE TO RELATED APPLICATIONS

This application is a U.S. National Stage application under 35 U.S.C. § 371 of International Application PCT/NL2021/050025 (published as WO 2021/145768 A1), filed Jan. 18, 2021 which claims the benefit of priority to Application EP 20152269.5, filed Jan. 16, 2020. Benefit of the filing date of these prior applications is hereby claimed. Each of these prior applications is hereby incorporated by reference in its entirety.

BACKGROUND

In the field of ultrasound imaging, it is known to transmit ultrasound using an array of sound transmitters and to receive ultrasound using an array of sound receivers. In known devices, arrays of piezo-electric elements are used, wherein the piezo-electric elements at different locations in the array are used to generate sound in response to the application of electronic signals and/or to generate electronic signals in response incoming sound vibrations.

In the field of photo-acoustics optical sound generators are known, which comprise an optical fiber that acts as a waveguide for light and light absorbing material at the tip of the fiber or along the fiber at a place where the fiber is made to couple light out of the fiber. When a light pulse is transmitted through such a fiber, it heats the light absorbing material, which causes sudden expansion of this material that results in the emission of sound waves.

In the field of photo-acoustics optical sound detectors are known, which comprise a membrane that is exposed to incoming sound and an optical waveguide on the membrane. The membrane vibrates under the influence of incoming sound. This causes strain on the optical waveguide, which affects the transmission properties of light through optical waveguide, e.g. its delay. Measurements using the transmitted light can be used to detect the incoming waves.

A photonic integrated device comprises a combination of different solid state optical components manufactured in a fixed arrangement on the same planar substrate such as a wafer, optionally including one or more components created by stacking volumes of different solid state materials on top of each other, without intermediate optical waveguides between these volumes. The photonic integrated device may be a device that contains only such components, or it may be a hybrid photonic integrated device that comprises one or more separately manufactured components that have been fixed on the integrated device coupled to one or more other components of the photonic integrated device. In the field of optical integration it is known to realize a device that transmits light in the direction nearly perpendicular to a surface of the device (e.g. at an angle of ten degree or more to the surface normal) using light that is supplied through one or more waveguides in the device that run parallel to the surface. This can be realized by using a grating on the waveguide, a mirror at the end of the waveguide or by means of evanescent coupling. See Vermeulen, 'High-efficiency fiber-to-chip grating couplers realized using an advanced CMOS-compatible Silicon-On-Insulator platform', OPTICS EXPRESS, 16 Aug. 2010/Vol. 18, No. 17/18278. This can be used in a wafer that forms a photonic integrated device, to couple light out of and/or into the photonic integrated device.

JP2016170025 discloses device for inspection of optical circuits on a wafer, with such gratings to couple light into and/or out of the device. For the purpose of inspection of operation of the device, optical fibers are temporarily placed on the grating couplers. This can make inspection difficult and time consuming because it requires accurate temporary fiber positioning to enable coupling. To solve this problem, JP2016170025 discloses inspection involving placement of a liquid reservoir over the grating. Light emanating from the wafer causes photo-acoustic conversion in the liquid and sound generated by the light due to this conversion is detected. This obviates the need for accurate positioning.

When it is needed to produce a substantial sound strength from a photonic integrated device with permanently integrated photo-acoustic sound generation, a solid state photo-acoustic conversion body with a size in at least the order of magnitude of the acoustic wavelength needs to be integrated on the device, i.e. as a 2-D patterned volume of solid state photo-acoustic material e.g. obtained by patterned deposition or layer deposition followed by 2D patterning. However, even if such large photo-acoustic conversion bodies are integrated, sound generation by illumination of the body from an optical waveguide may not be efficient, because the dimensions of optical waveguides in a photonic integrated device are usually much smaller the integrated photo-acoustic conversion bodies that have larger dimensions than the optical waveguides in at least two spatial directions.

SUMMARY

It is an object to make it possible to provide for efficient sound generation.

According to one aspect a photonic integrated device for converting a light signal into sound is provided, the photonic integrated device comprising

- a substrate having a substrate surface;
- an optical waveguide on the substrate surface;
- a photo-acoustic conversion body integrated in the device, the photo-acoustic conversion body comprising at least one volume of fractionally light absorbing material or formed entirely of fractionally light absorbing material, wherein a width of the photo-acoustic conversion body is greater than a width of the optical waveguide and
- means integrated in the device for enhancing distribution of light from the optical waveguide over the photo-acoustic conversion body. By enhancing the distribution of light from the optical waveguide over the photo-acoustic conversion body more effective sound generation is made possible in a photo-acoustic conversion body that may be much wider and/or higher than the optical waveguide in order to provide for effective sound generation at lower frequencies.

In an embodiment, the means for enhancing distribution of light comprises a coupling structure configured to transmit light from the optical waveguide through the photo-acoustic conversion body in a direction transverse to the substrate surface. In this way the light from the optical waveguide will be distributed over the height of the photo-acoustic conversion body. The height of the photo-acoustic conversion body is preferably greater than that of the optical waveguide, so that the frequency range of the generated acoustic signal is not limited by the height of the optical waveguide. As used herein the direction of transmission of the light is the direction wherein the light has the highest intensity. The direction transverse to the substrate surface may be perpendicular to the substrate surface, or oblique, e.g. less than thirty degrees to the normal to the substrate surface.

The photo-acoustic conversion body may extend over a range of heights in the direction perpendicular to the substrate surface, wherein the optical waveguide lies at a height outside said range of heights, the photonic integrated device comprising a coupling structure on top of or underneath the photo-acoustic conversion body.

In an embodiment, the coupling structure comprises at least one of a grating on a part of the optical waveguide, a mirror on the optical waveguide, and a facet of the optical waveguide In an embodiment, the optical waveguide extends along an linear optical path in a plane parallel to the substrate surface, adjacent to a top or bottom surface of the photo-acoustic conversion body, or within the photo-acoustic conversion body, the means for enhancing distribution of light comprising a plurality of coupling structures configured to direct light from the optical waveguide into the substrate surface at different locations along the optical path. In this way the light from the optical waveguide will be distributed over the height of the photo-acoustic conversion body at a plurality of points along a line.

In an embodiment, the optical waveguide extends along an optical path in a plane parallel to the substrate surface, adjacent to a top or bottom surface of the photo-acoustic conversion body, or within the photo-acoustic conversion body, wherein a shape of the optical path is configured to guide the light along successive positions distributed over two dimensions in a two-dimensional area in said plane (i.e. at least not all along a straight line), the means for enhancing distribution of light comprising a plurality of coupling structures configured to direct light from the optical waveguide into the substrate surface at different locations along the optical path. In this way the light from the optical waveguide will be distributed over the height of the photo-acoustic conversion body at a plurality of points in a two dimensional area, not just along a linear optical path. The shape of the optical path may be an inward spiral for example. Other shapes may include a zig-zagging optical path or a shape with successive parallel path parts next to each other, alternately in opposite directions and connected by U turns or reflectors.

In an embodiment, the means for enhancing distribution of light comprises an optical splitter with an input coupled to the optical waveguides; a plurality of coupling structures at different locations on top of or under the photo-acoustic conversion body; and a plurality of intermediate optical waveguides on top of or underneath the photo-acoustic conversion body, coupled between outputs of the splitter and respective ones of the coupling structures. This provides an alternative way of distributing light from the optical waveguide over the height of the photo-acoustic conversion body at a plurality of points.

In an embodiment the photo-acoustic conversion body comprises a plurality of distinct layers of fractionally light absorbing material at different heights within its height.

For example, distinct layers may be used for temporal shaping of the acoustic signal that emerges from the photo-acoustic conversion body in the direction perpendicular to the substrate surface. This can be realized by using an intermediate layer in the photo-acoustic conversion body, separating the fractionally light absorbing layers, a material of the intermediate layer having a lower light absorption coefficient than the material or materials of the layers of fractionally light absorbing material.

As other examples, distinct layers may be used to provide for spectral or directional shaping of the acoustic signal that emerges from the photo-acoustic conversion body. There may be a difference between cross-section area size and/or shapes of the layers of fractionally light absorbing material of cross-sections with virtual planes parallel to the surface of the substrate. As another example, a difference between heights of the layers of fractionally light absorbing material may be used. As another example, use may be made of a difference between the optical absorption coefficients of materials of the layers of fractionally light absorbing material, or a different optical wavelength dependence of these optical absorption coefficients.

In other embodiments, the optical waveguide may be configured to transmit light through the photo-acoustic conversion body in a direction or directions parallel to the substrate surface. In this case the height of the optical waveguide and that of the photo-acoustic conversion body may be the same or similar, but preferably the photo-acoustic conversion body is wider than the optical waveguide, so as to provide for emission of lower acoustic frequencies. The optical waveguide may lie at a height within the range of heights of the photo-acoustic conversion body.

In an embodiment, the photo-acoustic conversion body is configured to provide for multiple internal reflection of light from the optical waveguide within the photo-acoustic conversion body, in a virtual plane parallel to the substrate surface, thus realizing means for enhancing distribution of light. The photo-acoustic conversion body may be provided for reflective sidewalls to provide for the internal reflection, or the optical waveguide may be arranged so that the angle of incidence of the light from the optical waveguide causes reflection. Diffuse or specular reflection may be used. Multiple internal reflection of light may be realized for example by using a photo-acoustic conversion body that has a circular cross-section and directing light from the optical waveguide in a non-radial direction of the circular cross-section. But other types of cross sections may be used wherein light from the optical waveguide is directed in a direction so that it will be reflected from the wall of the photo-acoustic conversion body without reflection directly back to the optical waveguide.

In an embodiment the photo-acoustic conversion body on the substrate forms a further optical waveguide coupled to the optical waveguide, the further optical waveguide containing the fractionally light absorbing material and extending an optical path in a plane parallel to the substrate surface, wherein a shape of the optical path is configured to guide the light along positions distributed over two dimensions in a two-dimensional area in said plane. In this way, absorption of light from the optical waveguide formed by the photo-acoustic conversion body can be distributed over a larger area of that body, thus realizing means for enhancing distribution of light. Although such a photo-acoustic conversion body forms a waveguide for light, it will vibrate acoustically as a homogeneous body because acoustic wavelengths are larger the optical wavelength. The shape of the optical path may be an inward spiral for example. Other shapes may include a zig-zagging optical path or a shape with successive parallel path parts next to each other, alternately in opposite directions and connected by U turns or reflectors.

In an embodiment, the means for enhancing distribution of light comprises an optical splitter on the substrate, a plurality of optical waveguides on said substrate surface, coupled between outputs of the splitter and respective different locations along a circumference of the photo-acoustic conversion body in said plane. Thus, light can be fed into the side surface of the photo-acoustic conversion body at different positions and/or in different directions, to provide for a wider distribution of sound generation.

In an embodiment, a first part of the optical waveguide has a constant width on the substrate that is smaller than a width of the side surface of the photo-acoustic conversion body, the optical waveguide comprising a widening waveguide part between the first part of the optical waveguide and the photo-acoustic conversion body. Such a flared out wave guide helps to distribute the light over a larger range in a plane parallel to the substrate surface.

In an embodiment, the means for enhancing distribution of light from the optical waveguide are configured to couple evanescent light into the photo-acoustic conversion body. Evanescent light coupling only penetrates outside the optical waveguide over a small distance of the order of a wavelength, but if a large area of evanescent light coupling to the photo-acoustic conversion body is used, evanescent light coupling may provide for sufficient sound generation in the photo-acoustic conversion body.

In an embodiment, the means for enhancing distribution of light comprises an optical splitter having an input coupled to the optical waveguides and a plurality of outputs, a plurality of parallel optical waveguides at a pitch so that evanescent fields from the parallel optical waveguides overlap, each of the plurality of parallel optical waveguides coupled to a respective one of the outputs of the optical splitter. In this way a larger area of evanescent light coupling can be realized.

In an embodiment the coupling structure comprises one or more bends in the optical waveguide configured to provide for evanescent coupling between the optical waveguide and the photo-acoustic conversion body at the bends. Bends in the optical waveguide increase evanescent light coupling.

In an embodiment the photo-acoustic conversion body is embedded in a volume optically transparent material that comprises a part between the photo-acoustic conversion body and the optical waveguide, the photo-acoustic conversion body lying within a distance from the optical waveguide, the distance being so small as to allow for an evanescent light coupling between the optical waveguide and the photo-acoustic conversion body. Thus, the shape of the photo-acoustic conversion body need not follow that of the surface. The photo-acoustic conversion body may be sphere shaped, or arch shaped for example, so as to adapt the acoustic radiation pattern.

BRIEF DESCRIPTION OF THE DRAWING

These and other objects and advantageous aspects will become apparent from a description of exemplary embodiments with reference to the following figures.

FIG. 5 shows a multiplexed array
FIG. 6 shows an array with row and column waveguides
FIG. 15 shows a spiral optical waveguide of a photo-acoustic transmitter

DETAILED DESCRIPTION OF EXEMPLARY EMBODIMENTS

Figure 1E:
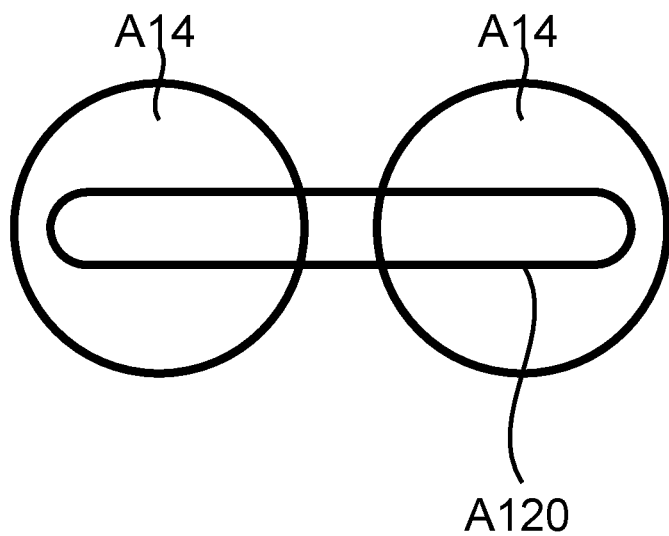
FIG. 1 shows a sound detecting system
FIGS. 1a,b illustrate a known type of integrated acoustic-photo conversion device
FIG. 1c shows an embodiment with a parallel coupled optical ring resonator
FIG. 1d shows an embodiment with a series coupled optical ring resonator
FIGS. 1e, f shows an embodiments with a resonator over a group of openings
FIG. 1g shows an interferometer embodiment

FIG. 1 shows a sound detecting system comprising an integrated photo-electronic circuit 1, an acoustic-photo conversion device 3 and an optical fiber or fiber bundle 5 connecting the photo-electronic circuit 1 and acoustic-photo conversion device 3. As used herein, the term "sound" covers ultra-sound as well as other sound, and where devices are said to produce or receive "sound" this refers to production or reception at least in an (ultra-) sound frequency range, but not necessarily to a frequency range that included all sound frequencies.

By way of example, integrated acoustic-photo conversion device 3 is shown to contain a two dimensional array of converters 7 (only one labeled). Photo-electronic circuit 1 has an electric power supply input 9 and contains one or more light sources 1a (e.g. laser diodes or LEDs) and one or more photo-electric detectors 1b. Photo-electric detectors 1b may be followed by analog to digital converters and signal processing circuits (not shown).

Acoustic-photo conversion device 3 is preferably a planar device with a substantially planar surface, through which converters 7 receive sound and optionally transmits sound and/or light. Acoustic-photo conversion device 3 comprises optical waveguides (not shown) that extend in parallel with this surface (so that the propagation direction of the light in the optical waveguides is parallel to the surface) to supply to converters 7 and/or receive light from to converters 7.

Photo-electronic circuit 1 is configured to couple light from the one or more light sources 1a to optical fiber or fiber bundle 5 and to couple light from optical fiber or fiber bundle 5 to the one or more photo-electric detectors 1b. Acoustic-photo conversion device 3 is configured to feed the light to converters 7. In an embodiment, converters 7 include converters that are configured to generate sound in response to the light from optical fiber or fiber bundle 5 and transmit the generated sound to a target outside the system. In an embodiment, converters 7 include converters that are configured to transmit light to a target outside the system.

At least part of converters 7 are configured to modulate properties of light from optical fiber or fiber bundle 5 dependent on incoming sound from outside the system. Acoustic-photo conversion device 3 is configured to transmit light with the modulated properties through optical fiber or fiber bundle 5. Photo-electronic circuit 1 is configured to supply the light from optical fiber or fiber bundle 5 to the one or more photo-electric detectors 1b.

Preferably, optical fiber or fiber bundle 5 allows flexible movement of photo-electronic circuit 1 and acoustic-photo conversion device 3 relative to each other. This provides for flexible use of acoustic-photo conversion device 3. Also preferably, acoustic-photo conversion device 3 is non-electric in the sense that it does not require an electric power supply to operate, its operation being driven entirely by light supplied from photo-electronic circuit 1 and sound from outside the system. This provides for more safety in environments where electric signals could affect safety.

Alternatively, photo-electronic circuit 1 and acoustic-photo conversion device 3 can be integrated on a single substrate. This would make the device more compact.

Different aspects of light based sound generation and detection in the integrated acoustic-photo conversion device 3 will be described in sections on photo-acoustic converters using guided light, an array of photo-acoustic generators, acoustic-photo converters using guided light, an array of acoustic-photo converters and a combination of a transmitter and a receiver. This description describes implementations that a suitable for use in an integrated acoustic-photo conversion device 3 that is part of a system such as shown in FIG. 1. However, it should be noted that these implementations can also be used per se outside this context.

Waveguides in integrated optical devices are known per se. Such a waveguide may comprise a track of at least partly optically transparent material on a substrate, wherein the material of the track has a first index of refraction and the track is surrounded by a material having another index of refraction (or materials having another indexes of refraction), so as to prevent wave propagation of the light from the track into the surrounding material.

The described photo-acoustic converters are designed for use in arrays for increasing the intensity of the generated sound, adapting its bandwidth and/or generating directive sound. When the photo-acoustic converters are distributed over a range of directions that is comparable to the acoustic wavelength or wider variable control of the direction and shape of the sound direction pattern produced by the array is possible. Similarly, the described acoustic-photo converters are designed for use in arrays for detecting sound with increased signal to noise ratio, adapted reception bandwidth and/or from a selected direction. When the photo-acoustic converters are distributed over a range of directions that is comparable to the acoustic wavelength or wider the sound selectivity pattern direction and/or shape can be controlled. But the described photo-acoustic converters and acoustic-photo converters also have advantages outside the context of an array.

Acoustic-Photo Converters Using Guided Light

Acoustic-photo conversion uses the modulation of properties of light under influence of (ultra-) sound to produce a light signal that carries information about the sound. In an acoustic-photo converter that using guided light, the modulation of properties of light occurs in a waveguide.

FIGS. 1a, b illustrate a known type of integrated acoustic-photo conversion device, with a converter that comprises a membrane A10 exposed to incoming sound, with at least part of an optical waveguide A12 on membrane A10. Optical waveguide A12 extends in parallel with said surface, i.e. the propagation direction of the light in optical waveguide A12 is parallel to the surface. Membrane A10 is supported directly or indirectly by a substrate A16, with an opening A14 in substrate A16 below part of membrane A10, and at least part of optical waveguide A12 extending over the part of membrane A10 above opening A14. Opening A14 may have a circular cross-section for example, with an encircling wall formed by substrate A16. By way of example optical waveguide A12 is shown running from above one side of opening A14 to the opposite side over the middle of opening, but this is not essential: optical waveguide A12 may run off center, and/or it may contain one or more bends over opening A14.

Vibration of membrane A10 due to the incoming sound strains optical waveguide A12, modulating the optical length of optical waveguide A12. The optical path length modulates a property (the phase delay) of light transmitted through optical waveguide A12. This may be due to a change of length of optical waveguide A12 and/or phase delay due to a change of the degree of bending of optical waveguide A12. Strain may cause a change in physical length, and/or a deformation of the waveguide cross section of the waveguide, which affects its effective refractive index, and/or stress in the material that alters the refractive indices of the materials of which the waveguide is composed, which in turn also affects the effective refractive index. In turn the modulation can be converted to modulation of another property, such as a light intensity. Light with the modulated property is guided to a photo-electric detector (not shown) elsewhere. The effect of the optical path length changes on the properties of light can be made large e.g. by making optical waveguide A12 part of an optical ring resonator or by mixing the modulated light from optical waveguide A12 in an interferometer, with light that is not modulated by the path length changes, or modulated differently. As another example, the part of optical waveguide A12 extending over the part of membrane A10 above opening 14 may comprise a Fiber Bragg Grating (FBG).

The ring resonator version is known from an article by S. M. Leinders et al, titled "A sensitive optical micro-machined ultrasound sensor (OMUS) based on a silicon photonic ring resonator in an acoustical membrane", published in Nature Scientific Reports, 14328, DOI: 10.1038/srep14328, 1-8, 2015. Although an embodiment is shown wherein membrane A10 is used strain optical waveguide A12, it should be noted that other ways of straining may be used. In one example optical waveguide A12 may be located on a cantilever for example a cantilever that extends in a direction parallel to the surface of substrate A16, with an open space between the cantilever and substrate A16. The cantilever may be attached at one of its ends to substrate A16 via a support structure. Preferably having a resonance frequency in an operational desired sound frequency range of the device. Instead of a cantilever any other mechanical resonator structures may be used, such as a disk on a support structure, so that the disk extends spaced from substrate A16 on all sides of the support structure.

FIGS. 1c and 1d show embodiments with an optical ring resonator A120 containing a closed loop optical waveguide with at least a part A12 on the membrane (not shown) above the opening (not shown) in the substrate (not shown). FIG. 1c shows a "parallel coupling" embodiment with an ongoing optical waveguide A122 with an optical coupler A123 between ongoing optical waveguide A122 and optical ring resonator A120. FIG. 1d shows a "serial coupling" embodiment with a feed optical waveguide A124a and an output optical waveguide A124b with optical couplers A125a,b between optical ring resonator A120 on one hand and feed optical waveguide A124a and output optical waveguide A124b on the other hand respectively. Optical coupler A123 optical couplers A125a,b may be proximity based couplers based on the presence of an evanescent light field from one of the coupled optical waveguides that extends into the other coupled optical waveguide or vice versa. Such devices are commonly known as 'directional couplers'. Other types of couplers can be used, for example Multi Mode Interference couplers (MMIs), or others.

In the "parallel coupling" embodiment the effect of incoming sound shows up in the optical wavelength position of a dip in transmission along ongoing optical waveguide A122 due to resonance in optical ring resonator A120. In the "serial coupling" embodiment the effect of incoming sound shows up in the optical wavelength position of a peak in transmission from feed optical waveguide A124a to output optical waveguide A124b via optical ring resonator A120.

Figure 1F:
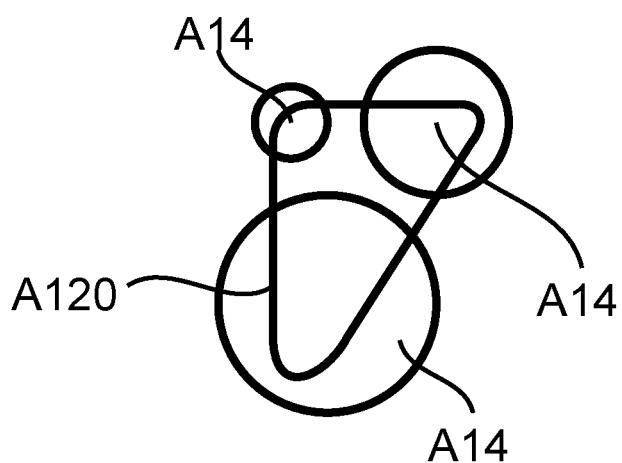

FIGS. 1e,f show embodiments wherein optical ring resonator A120 is formed by a looped optical waveguide that runs on membranes over a group of openings A14. As a result vibrations of the membranes over all openings A14 in the group affects the strain of such an optical ring resonator A120. The effects of the sound on the parts of optical ring resonator A120 over different holes adds up, at least when the sound arrives from a direction perpendicular to the surface of the substrate. Although FIGS. 1e,f shows groups of two and three openings A14 by way of illustration, it should be realized that a group may contain more openings A14, with the looped optical waveguide that forms optical ring resonator A120 running on all membranes over openings A14 of such a group.

Similarly, although FIGS. 1e,f show optical ring resonators A120 of specific shapes, it should be realized that optical ring resonators A120 of other shapes may be used, for example with more than one curves on at least part of the membranes. This can be used to increase sensitivity.

In an embodiment, the group consists of openings of the same size and shape, as in FIG. 1e for example. In such an embodiment the group may be used to provide for an increase of the effect of incoming sound on the optical resonance wavelength of optical ring resonator A120. In another embodiment, the group comprises openings of mutually different size and/or shape, as in FIG. 1f for example. The acoustic resonance frequency of the membranes, and more generally the acoustic resonance frequency bands wherein the membranes respond most strongly to incoming sound, depend on the size and shape of openings A14. Therefore, an optical ring resonator A120 over a group of openings with different size and/or shape has the effect of broadening the acoustic frequency range over which optical ring resonator A120 can be used to detect sound. Preferably, group contains openings A14 that have cross-section areas which differ so much that their 3 dB acoustic bandwidths do not overlap e.g. by a factor of at least 1.1 or 1.2 in area.

Figure 1G:
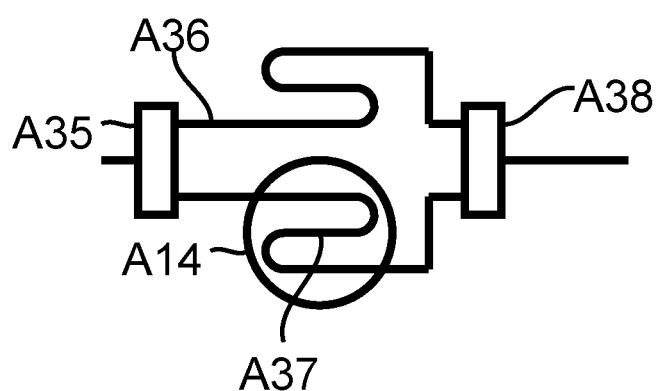

FIG. 1g illustrates the interferometer embodiment. In the illustrated embodiment, a Michaelson type interferometer is used, wherein an optical splitter A35 is used to split light from a light source (not shown) the split light is supplied to an optical combiner A38 via optical waveguides that form a first and second optical path A37, A36, respectively.

In an embodiment the first optical path A37 at least partly runs on a membrane over an opening A14 and the second optical path A36 does not run on a membrane over any opening A14. As result, phase delay changes due to membrane vibration along the first optical path A37 will result in interference changes. In another embodiment a first and second openings with membranes that are acoustically resonant in a first and second non-overlapping acoustic frequency bands may be used, the first optical path A37 running on membrane over the first opening but not over the second opening and the second optical path A36 running on membrane over the second openings A14 but not over the first openings. Thus, a combined acoustic bandwidth detection can be realized.

Preferably, the parts of the optical waveguide(s) that form(s) optical paths A36, A37 of each optical interferometer that runs on the membrane over the openings A14 is as long as possible in view of the space on the membranes. For the sake of illustration FIG. 3c shows an optical path that is formed by an optical waveguide along a track that comprises a few parallel parts over the opening A14 through which the light propagates successively in spatially alternating directions. In practice, more such alternating parallel parts may be present over the opening A14, or an optical waveguide with another shape may be used. For example, an optical waveguide along a track that comprises a pair of spirals over the opening A14 wherein the light first propagates inward along a first spiral track and then continues outward through a second spiral track interleaved between successive parts of the track of the first spiral.

The effect of the optical length change is measured from frequency shift of the resonance peak of the ring resonator or the phase shift detected with the interferometer. In these example sound is used to cause vibration of the membrane A10, a cantilever or another mechanical resonator structure and the strain of optical waveguide A12 caused by the vibration is converted to detectable intensity variation by means of the ring resonator or interferometers.

In another example variation of evanescent coupling between a first optical waveguide on mechanical resonator structure and a second optical waveguide near the first optical waveguide but not on the same mechanical resonator structure may be used to convert the vibration to detectable intensity variations.

Figure 2A:
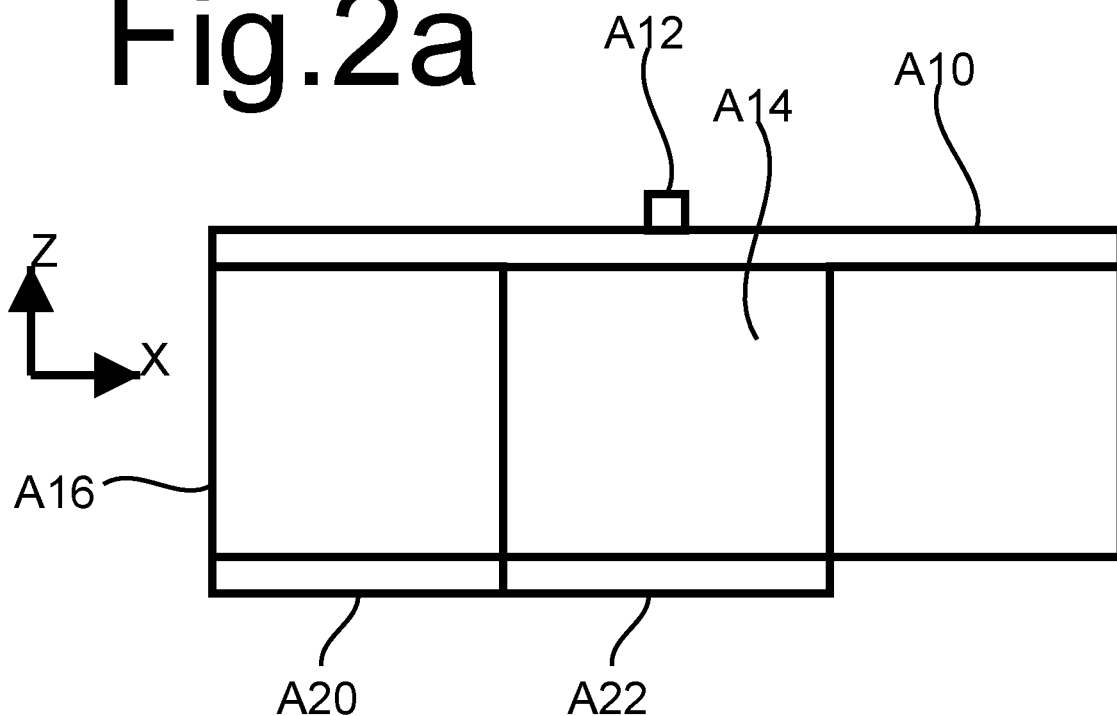
FIG. 2a shows an embodiment with an auxiliary waveguide

FIG. 2a shows an embodiment of an integrated acoustic-photo converter device, which further comprises an auxiliary waveguide A20 and a light coupling structure A22. Light coupling structure A22 is located in or underneath opening A14. Auxiliary waveguide A20 is configured to supply light to light coupling structure A22. Light coupling structure A22 is configured to direct light from auxiliary waveguide A20 to membrane A10 through opening A14. Any type of light coupling structure A22 suitable for this purpose may be used. For example, light coupling structure A22 may be an extension of auxiliary waveguide A20 wherein a grating is provided on auxiliary waveguide A20 which produces a coherent light wave front travelling towards membrane A10 when light with a predetermined wavelength is supplied through auxiliary waveguide A20. In another example, light coupling structure A22 may comprise a reflector, oriented to reflect light from auxiliary waveguide A20 towards membrane A10, or auxiliary waveguide A20 may end in an oblique facet that reflect light from auxiliary waveguide A20 towards membrane A10. A plurality of auxiliary waveguides A20, each with a corresponding light coupling structure A22 or with a shared light coupling structure A22 may be used to direct light to membrane A10 through opening A14.

The device according to FIG. 2a may be manufactured for example by manufacturing a first substrate A16 with a membrane layer on its front surface top and optical waveguides on the membrane layer, with openings through the first substrate (obtained e.g. by selectively etching holes through the first substrate from its back surface using a process that does not etch away the membrane. A second substrate with auxiliary waveguide A20 and coupling structure A22 can be manufactured separately. In this example, the device may be formed by bonding the second substrate to the first substrate.

In an embodiment, the device according to FIG. 2a may be used to transmit the light that is directed into opening A14 from auxiliary waveguide A20 through membrane A10 to a target outside the device. For this purpose, membrane A10 is preferably transparent at least in a predetermined wavelength band, and no layers are present in the device in the light path from light coupling structure A22 through membrane A10 to the exterior surface of the device. When transmitted light results in photo-acoustic conversion in the target, this results in sound that causes membrane A10 to vibrate. In this case, the resulting vibrations can be measured by means of their effect on the properties of the light in optical waveguide A12. Transmitting the light through membrane A10 at opening A14 and receiving the sound with membrane A10 at the same position has the advantage that only a small area is needed. When an array of such openings is used, as high array density can be realized. Also, no correction for the offset between the surface position of light transmission and sound reception is needed in this case.

In another embodiment, the device according to FIG. 2a may be used to convert the light that is directed into opening A14 from auxiliary waveguide A20 into sound at membrane A10, for transmitting that sound to the target outside the device. For this purpose, a dye layer is preferably provided on membrane A10 that absorbs light at least in a predetermined wavelength band, and/or membrane A10 is made of a material that absorbs light at least in that predetermined wavelength.

In operation, a light pulse transmitted through auxiliary waveguide A20 may be used to generate a sound pulse prior to measurement of reflected sound using light through optical waveguide A12. Subsequently reflected sound causes vibrations of membrane A10. When this occurs with a sufficient delay from the light pulse, the resulting vibrations can be measured by means of their effect on the properties of the light in optical waveguide A12. Transmitting sound with membrane A10 at opening A14 and receiving reflected sound with membrane A10 at the same position has the advantage that only a small area is needed. When an array of such openings is used, as high array density can be realized. Also, no correction for the offset between the surface position of light transmission and sound reception is needed in this case.

In a further embodiment, the embodiments with light transmission and sound transmission may be combined. For this purpose, a dye layer may be provided on membrane A10 that absorbs light at least in a first predetermined wavelength band, and/or membrane A10 is made of a material that absorbs light at least in that first predetermined wavelength band, whereas the membrane and the dye layer (if used) is transparent in a second predetermined wavelength band. In this embodiment light with a wavelength in the first predetermined wavelength band may be supplied through auxiliary waveguide A20 to produce transmitted sound, light with a wavelength in the second predetermined wavelength band may be supplied through auxiliary waveguide A20 to produce transmitted light. The response of the target to both can be measured from the effect of vibrations on the properties of the light in optical waveguide A12.

In another or further embodiment of use of the device of FIG. 2a, light from auxiliary waveguide A20 may be used to adjust a pre-stress membrane A10. Pre-stress of membrane A10 can be used to adjust the sensitivity of sound detection. This will be illustrated for the embodiment using a resonator ring.

Figure 2B:
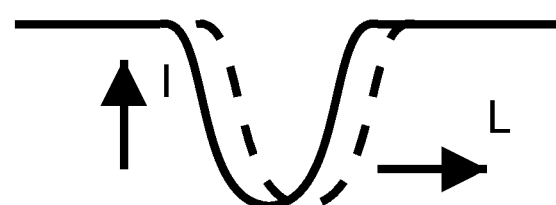
FIG. 2b shows transmitted light intensity as a function of wavelength

FIG. 2b shows the intensity I of light transmitted by ongoing optical waveguide A122 as a function of wavelength L of the light transmitted. This function has a dip due to resonance of the resonator. Strain of membrane A10 over opening A14 cause a shift of the dip as a function of wavelength, as indicated by the dashed curve. A sensitive measurement of vibrations may be obtained by supplying light through ongoing optical waveguide A122 at a wavelength that lies on a flank of the dip (e.g. where the transmitted intensity on average is between thirty and sixty percent of the intensity outside the dip and the lowest intensity in the dip, preferably on average at fifty percent), and measuring intensity changes of the transmitted light under influence of vibrations of membrane A10.

However, if the wavelength of the light supplied through ongoing optical waveguide A122 is near the lowest point or nearly outside the dip, the response may be non-linear and/or smaller. The position of the dip (the wavelength of the deepest position) may vary not only due to vibration of membrane A10 but also due to variation of its temperature. Hence, even when light with a fixed wavelength is used, the position of the dip relative to the wavelength may change, which can result in non-linearity or low sensitivity. Similarly, when a manufacturing process is used that is not sufficiently accurate to match the wavelength of the light source and the wavelength of the dip to within a small fraction of the width of the dip, non-linearity or low sensitivity can arise.

Figure 2C:
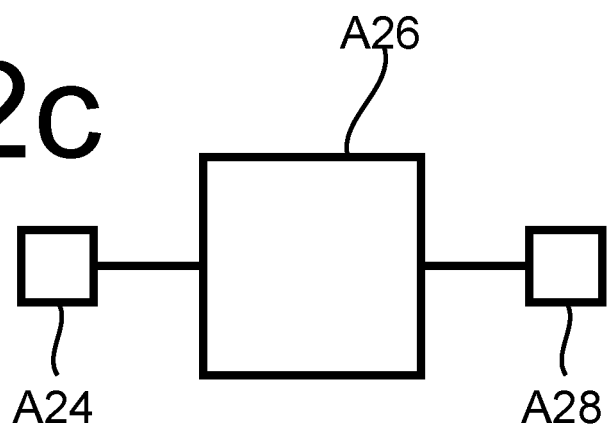
FIG. 2c shows a control circuit
FIG. 3a a plurality of acoustic-photo conversion elements coupled in parallel
FIG. 3b a plurality of acoustic-photo conversion elements coupled in series

FIG. 2c shows a control circuit for adjusting the position of the dip by adjusting pre-stress on the membrane. The control circuit comprises a controller A26, a photoelectric detector A24 coupled to an input of controller A26, and a light source A28 coupled to outputs of controller A26. An embodiment of FIG. 2a a is used wherein a dye layer is provided on a surface of membrane A10 that absorbs light at least in a predetermined wavelength band, or membrane A10 itself is of a material that absorbs such light.

Photoelectric detector A24 is arranged to receive light that had been modulated by the optical waveguide on the membrane (not shown), for example using a ring resonator configuration as shown in FIG. 1c or 1d. Light source A28 is optically coupled to auxiliary waveguide A20.

Controller A26 is configured to control the intensity of light supplied by light source A28 to adjust the temperature of the membrane so as to shift the average position of the dip (which corresponds to its position absent vibration) to a position where the wavelength of the light in ongoing optical waveguide A122 is on the flank of the dip. Preferably the control circuit limits the frequency band of the variation of the intensity of light supplied by light source A28 to a frequency band below the frequency band of the sound vibrations.

Any suitable control mechanism may be used. For example, controller A26 may form a feedback loop that adjusts the intensity of light supplied by light source A28 dependent on the difference between the average intensity detected by photoelectric detector A24 and a reference intensity. The reference intensity may be an intensity halfway the intensity outside the dip and the lowest intensity in the dip (or a predetermined percentage between thirty and sixty percent of the intensity outside the dip and the lowest intensity in the dip). Controller A26 may be configured to select the reference intensity in a calibration step by detecting maximum and minimum intensity detected by photoelectric detector A24 when controller A26 varies the intensity of light source A28.

As another example, controller A26 may set the reference by determining an intensity value of light supplied by light source A28 for which the intensity detected by photoelectric detector A24 varies most strongly in response to the variation of light intensity supplied by light source A28. In other embodiments the wavelength of light transmitted through the ring resonator may be modulated and an intensity of light supplied by light source A28 may be selected that maximized the response of the detection of this modulation by photoelectric detector A24.

In another or further embodiment, controller A26 may be configured to perform a search for tuning a dip to a wavelength. Controller A26 may be configured to cause a light source (not shown) that is coupled to waveguide A12 to supply light with a single wavelength through waveguide A12, and to cause light source A28 to produce an intensity scan of the light supplied to auxiliary waveguide A20. Controller A26 may be configured to determine the intensity required to tune the dip to the wavelength from intensity measurements by photoelectric detector A24 as a function of time during the scan. Alternatively, controller A26 may be configured to cause a wavelength scan of the wavelength of the light supplied through waveguide A12 while the intensity of the light supplied to auxiliary waveguide A20 is kept constant and to detect the wavelength of the dip from intensity measurements by photoelectric detector A24 as a function of time during the wavelength scan.

Although the embodiment of FIG. 2 has been described with reference to use of a ring resonator as in FIG. 1c, it should be noted that a similar solution can be used when a ring resonator as in FIG. 1d is used. The difference is only that peaks instead of dips are used, with the highest intensity of the peak taking the place of the lowest intensity in the dip. The same goes for other ways of detecting effects of vibration on optical waveguide A12. When an FBG is used, controller A26 may be configured to shift the position of a dip or peak due to the FBG.

Although the embodiment of FIG. 2 has been described for heating the membrane A10 over a single opening A14, it should be noted that the membrane(s) over a plurality of openings at different positions in the substrate may be heated. In an embodiment, this can be realized by using a plurality of auxiliary waveguides, each for a respective one of the openings. In a further embodiment, these auxiliary waveguides may receive light from a common supply waveguide via an optical splitter. Both this common supply waveguide and the optical splitter may be part of the integrated acoustic-photo conversion device that also includes the membrane(s) and openings.

Also, an auxiliary waveguide may extend successively under a plurality of openings, so that light from the auxiliary waveguide can be used to heat the membrane over the plurality of openings. When a grating is used to couple light from the auxiliary waveguide to a membrane, and the auxiliary waveguide runs on beyond the grating, a fraction of the light intensity in the auxiliary waveguide runs on through the part of the auxiliary waveguide beyond the grating. This part may be used to supply light into a next opening and so on.

In a further embodiment, the gratings on the auxiliary waveguide at different openings may each be configured to diffract light of a respective different wavelength to the membrane over the opening. A photo-electronic circuit may be used to supply light at a plurality of wavelengths at these wavelengths through the auxiliary waveguide. By controlling the plurality of intensities of the light at these different wavelengths, at least partly independent heating of the membrane over the different openings can be realized using a single auxiliary waveguide. Similarly, at least partly independent heating can be realized for membranes over openings that are supplied from a common auxiliary waveguide via an optical splitter. Furthermore, an optical splitter could be used to supply light to a plurality of auxiliary waveguides that extend to a plurality of openings that each may have gratings for diffracting light of different wavelengths to the membrane. Alternatively, a wavelength selective optical splitter may be used. Summarizing, according to a first aspect a photonic integrated device is provided for converting sound into a modulation of a property of light in the device, the device comprising a substrate with an opening in a surface of the substrate;
a membrane layer extending over the opening, exposed to receive sound waves from outside the device;
a first optical waveguide on or in the membrane layer, extending in parallel with said surface, at least part of the first optical waveguide extending over the opening;
an auxiliary optical waveguide extending in parallel with said surface;
a light coupling structure in or below the opening, spaced from the membrane layer and the first optical waveguide, arranged to receive light from the auxiliary optical waveguide and to direct the light to the membrane.

A sound detecting system is provided comprising the photonic integrated device and a photo-electronic circuit, the photo-electronic circuit comprising a detector coupled to the first optical waveguide, configured to detect a property of light that has been modulated by light propagation through said part of the first optical waveguide;
a light source coupled to the auxiliary optical waveguide;
a processing circuit configured to control an intensity of light transmitted by the light source to the auxiliary optical waveguide.

The first optical waveguide on the membrane can be used to detect incoming sound on the membrane. For example, the first optical waveguide may from an optical resonator, such as a ring resonator, in which case changes of the resonance frequency due to deformation of the first optical waveguide under influence of vibration of the membrane can be used to detect incoming sound. As another example, the first optical waveguide may be part of an interferometer, in which case changes of interference due to optical phase changes of light transmitted through the first optical waveguide can be used to detect incoming sound.

At the same time, light supplied to the membrane via the auxiliary waveguide can be used to perform auxiliary functions for the light detection. In a first function, the light supplied from the auxiliary waveguide may be passed through the membrane, for example to cause photo-acoustic conversion in a target object. In this case the first optical waveguide may be used to detect the sound. Use of light transmission and sound reception via the same membrane simplifies the interpretation of the detected sound, and reduces the device area needed for the transmission and reception.

In a second function, the light supplied from the auxiliary waveguide, for example a light pulse, may be absorbed by the membrane, heating the membrane to transmission of an acoustic signal to a target object. In this case the first optical waveguide may be used to detect a reflection of that sound. Use of transmission and reception of sound via the same membrane simplifies the interpretation of the detected sound, and reduces the device area needed for the transmission and reception. In a third function, absorption of the light supplied from the auxiliary waveguide, for example continuous light, may be used to control the time average temperature of membrane and, through the temperature, a time average deformation of the membrane. When the first optical waveguide is part of an optical resonator, this can be used to tune the resonance optical wavelength, for example to match resonance optical wavelength to that of another optical resonator in the device. A processing circuit may be used to determine the optical resonance wavelengths and to control the intensity of the light supplied to the auxiliary waveguide in a feedback loop that reduces the difference between the optical resonance wavelengths.

In a further embodiment of the photonic integrated device the membrane may be of a light absorbing material, or comprises a layer of light absorbing material.

In a further embodiment the processing circuit may be configured to
cause the light source to transmit a light pulse through auxiliary optical waveguide to the light coupling structure, at a wavelength at which the membrane is at least partly transparent, so that light from the light pulse is transmitted through the membrane and
register variations of an output signal from the detector following transmission of the light pulse.

In a further embodiment of the sound detecting system, the membrane is of a light absorbing material, or comprises a layer of a light absorbing material, wherein the light source is configured to produce light with a wavelength at which said material absorbs the light.

In a further embodiment of the sound detecting system
said part of the first optical waveguide is part of a ring resonator or contains a fiber Bragg grating;
the membrane is of a light absorbing material, or comprises a layer of a light absorbing material,
the processing circuit is configured to control the intensity of light supplied by the light source to adjust the temperature of the membrane, whereby an average position of a resonance peak or dip due to the ring resonator or fiber Bragg grating is shifted to a position where a wavelength of the light that is modulated by light propagation through said part of the first waveguide lies on a flank of the resonance peak or dip.

In a further embodiment of sound detecting system the photonic integrated device and the photo-electronic circuit are separate devices, coupled by an optical fiber or bundle of optical fibers.

In an embodiment a sound detecting system is provided comprising a photonic integrated device for converting sound into a modulation of a property of light in the device, and a photo-electronic circuit, the photonic integrated device comprising
a substrate with an opening in a surface of the substrate;
a membrane layer extending over the opening, exposed to receive sound waves from outside the device, wherein the membrane is of a light absorbing material, or comprises a layer of light absorbing material;
a first optical waveguide on or in the membrane layer, extending in parallel with said surface, at least part of the first optical waveguide extending over the opening;
an auxiliary optical waveguide extending in parallel with said surface;
a light coupling structure in or below the opening, spaced from the membrane layer and the first optical waveguide, arranged to receive light from the auxiliary optical waveguide and to direct the light to the membrane;
the photo-electronic circuit comprising
a detector coupled to the first optical waveguide, configured to detect a property of light that has been modulated by light propagation through said part of the first optical waveguide;
a light source coupled to the auxiliary optical waveguide, the light source being configured to produce light with a wavelength at which said material absorbs the light;
a processing circuit configured to control an intensity of light transmitted by the light source to the auxiliary optical waveguide, wherein the processing circuit is configured to
cause the light source to transmit a light pulse through auxiliary optical waveguide to the light coupling structure, at a wavelength at which the membrane is at least partly transparent, so that light from the light pulse is transmitted through the membrane and
register variations of an output signal from the detector following transmission of the light pulse.

A method of detecting sound is provided using acoustic to photo conversion by modulating a property of first light propagating through a first optical waveguide on a membrane that is exposed to forces due to the sound, the method comprising transmitting second light to the membrane from an auxiliary optical waveguide, the second light being transmitted in a direction transverse to the surface of the membrane.

In a further embodiment the method comprises transmitting a pulse of the second light through the membrane and using the membrane to register sound produced by photo-acoustic conversion of the pulse of the second light in a target.

In a further embodiment of the method the membrane is of a light absorbing material, or comprises a layer of light absorbing material, the method comprising
exciting a pulse of sound by heating the membrane using a pulse of the second light at an optical wavelength where the absorbing material absorbs the light; and
using the membrane to register sound produced by photo-acoustic conversion of the pulse of the second light in a target.

In a further embodiment of the method the membrane is of a light absorbing material, or comprises a layer of light absorbing material and said part of the first optical waveguide is part of a ring resonator or contains a fiber Bragg grating, the method comprising using absorption of the second light to heat the membrane controlling an intensity of the second light to shift an average position of a resonance peak or dip due to the ring resonator or fiber Bragg grating to a position where a wavelength of the light that is modulated by light propagation through said part of the first waveguide lies on a flank of the resonance peak or dip.

Array of Acoustic-Photo Converters
Basic Arrays

Figure 3A:
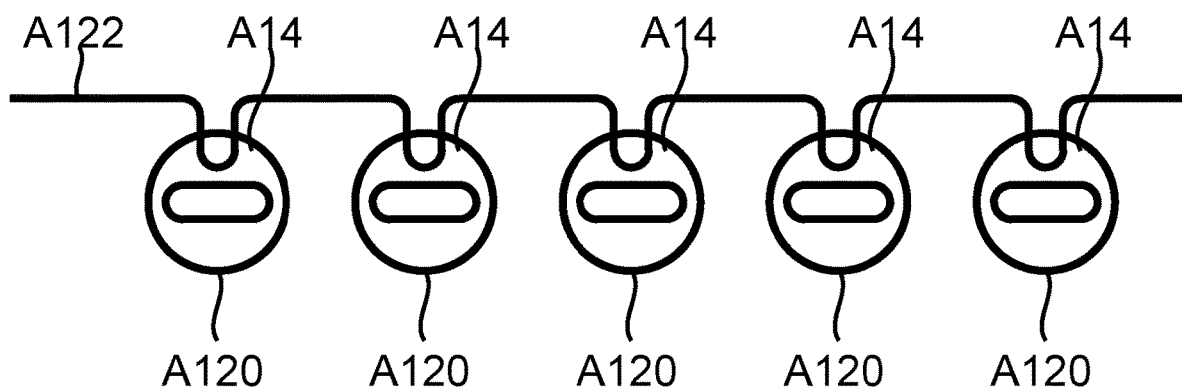
FIG. 3c shows an extended optical interferometer
FIG. 3d shows a coupled group of openings
FIGS. 3e, f shows arrays of acoustic-photo conversion elements
FIG. 3g shows an array of interferometers

FIG. 3a shows an integrated optical device with a series of acoustic-photo conversion elements coupled in parallel to an ongoing optical waveguide A122, each acoustic-photo conversion element comprising an optical ring resonator A120 on a membrane above an opening A14 in the substrate.

An ongoing optical waveguide A122 is provided that comprises coupling loops for the respective optical ring resonator A120 that optically couple the ongoing optical waveguide A122 to the respective optical ring resonators A120 in series. A light source and a light detector (not shown) are coupled to opposite ends of ongoing optical waveguide A122. The light source and the light detector may be located externally to the integrated optical device.

After each coupling loop, the intensity of light is reduced by a factor that depends on the wavelength of the light, the factor showing a dip around the resonance wavelength, i.e. increased attenuation as a function of wavelength. In an embodiment wherein identical ring resonators A120 are used and the dips are at identical wavelengths, the intensity of the light at the end of ongoing optical waveguide A122 is proportional to a product of the factors. Thus the attenuation due to the different optical resonators A120 accumulates at the end of fiber. For this type of measurement, tuning to match the resonance wavelengths of the resonators may used, unless an extremely accurate manufacturing process is available that ensures the resonators have matched resonance wavelengths, but this may not be feasible.

In operation, light is supplied ongoing optical waveguide A122, which travels along ongoing optical waveguide A122. A wavelength at a flank of the dip due to ring resonators A120 may be used. The membranes over openings A14 are exposed to sound, which causes vibrations of the membrane over each opening A14. This in turn causes variation of the optical length of ring resonators A120 over the openings A14 and hence shifting of the dips in the transmission of light through ongoing optical waveguide A122 as a function of time as the vibrational strain of the membrane changes with time. The detector converts the resulting time dependent intensity into an electronic signal.

By using a plurality of optical resonators A120 on different openings A14, the signal to noise ratio between the part of the electronic signal that is due to the sound and noise generated in the device is improved compared to the use of only one optical resonators A120.

In an embodiment wherein ring resonators A120 with different resonance wavelengths are used the a light source may be provided that is able to produce light at a plurality of optical wavelengths may be used, tuned to the flanks of the dips at different optical wavelength and the shifts of the dips may at different optical wavelengths may be measured.

Figure 3B:
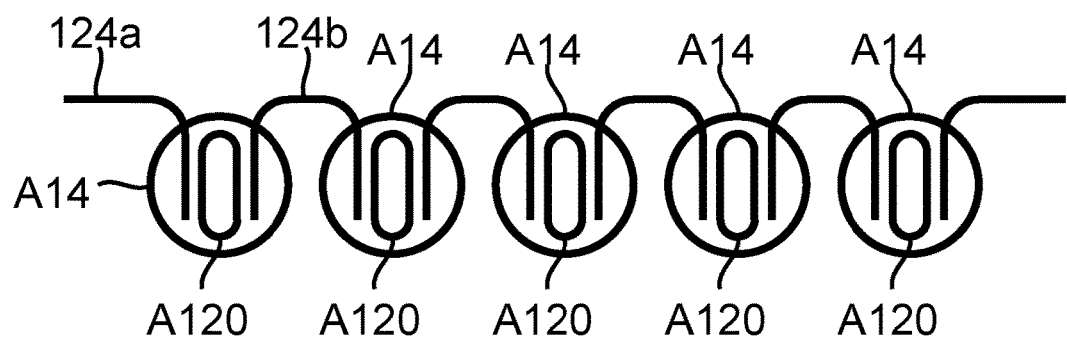
Figure 3C:
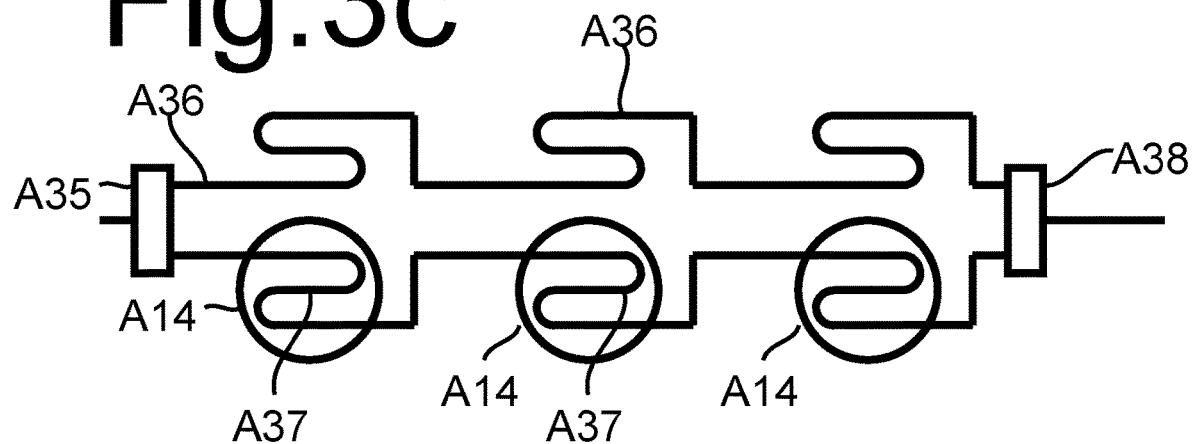

FIG. 3b also shows an integrated optical device with a plurality of acoustic-photo conversion elements, each acoustic-photo conversion element comprising an optical ring resonator A120 on a membrane above an opening A14 in the substrate. Instead of coupling to a single ongoing optical waveguide, each optical ring resonator A120 has separate couplings to a feed optical waveguide and an output optical waveguide. In the figure a feed optical waveguide 124a and an output optical waveguide 124b of a first optical ring resonator A120 are labeled. Optical ring resonator A120 coupled in series in the sense that the output optical waveguide of each but the last optical ring resonators A120 in the series coupling forms the feed optical waveguide for the next optical ring resonator A120.

The feed optical waveguide 124a of the first optical ring resonator A120 is coupled to a light source (not shown). The output optical fiber of the last optical waveguide 124a in the series coupling is coupled to a light detector (not shown). The light source and the light detector may be located externally to the integrated optical device.

Similar to the embodiment of FIG. 3a, the fraction of the intensity of light transmitted from the feed optical fiber to the output optical fiber is a factor that depends on the wavelength of the light. But in the embodiment of FIG. 3b the factor shows a peak around the resonance wavelength, i.e. increased transmission as a function of wavelength at the peak. In an embodiment wherein identical ring resonators A120 are used, the peaks are at identical wavelengths. Thus the transmission factors due to the different optical resonators A120 accumulates at the end of fiber and the signal to noise ratio is improved. For this type of measurement, tuning to match the resonance wavelengths of the resonators may used, unless an extremely accurate manufacturing process is available that ensures the resonators have matched resonance wavelengths, but this may not be feasible. However, tuning is easier to accomplish for the embodiment of FIG. 3a.

Although FIGS. 3a and 3b show embodiments wherein each opening A14 is provided with its own optical ring resonator, with an optical waveguide loop on the membrane on the opening, it should be appreciated that alternatively one or more optical ring resonators may be used that are formed with an optical waveguide loop that partly runs over the substrate where no opening is present, and/or over the membranes of two or more of the openings. This reduces the number of couplers that is needed and may provide for measurements over small openings A14 over which little space is available. The signal to noise ratio can be increased in this way as well.

FIG. 3c shows an embodiment with an optical interferometer. The optical interferometer comprises a splitter A35 and a combiner A38 and a first and second optical path A37, A36 between outputs of the splitter A35 and inputs of the combiner A38 of the optical interferometer. First and second optical path A37, A36 are formed by optical waveguides that run partly on the substrate and partly on membranes over openings A14. By way of illustration an embodiment with a one way combiner A38 is shown, but alternatively an n-way combiner may be used, that is configured to combine light from first and second optical path A36, A37 in n different relative phase offsets, e.g. with n=3 or larger.

A light source (not shown) is coupled to an input of splitter A35. A photodetector or photodetectors (not shown) is or are coupled to the output of outputs of combiner A38. The first optical path A37 of the interferometer runs on the membranes of a plurality of openings A14. In the illustrated embodiment, the second optical path A36 runs outside the membrane over the openings A14.

Preferably, the parts of the optical waveguide(s) that form(s) optical paths A36, A37 of each optical interferometer that runs on the membrane over the openings A14 is as long as possible in view of the space on the membranes. For the sake of illustration FIG. 3*b* shows an optical path that is formed by an optical waveguide along a track that comprises a few parallel parts over the opening A14 through which the light propagates successively in spatially alternating directions. In practice, more such alternating parallel parts may be present over the opening A14, or an optical waveguide with another shape may be used. For example, an optical waveguide along a track that comprises a pair of spirals over the opening A14 wherein the light first propagates inward along a first spiral track and then continues outward through a second spiral track interleaved between successive parts of the track of the first spiral.

When light is supplied to optical input A35, a mix of light that has travelled through the first and second optical paths A36, A37 is formed. The device is exposed to incoming sound, which causes vibration of the membranes over the openings. This causes strain on the parts of the optical waveguide that are on the membranes over the openings, which in turn affects the phase delay due to the optical waveguide and hence the phase difference between light from first and second optical path A36, A37 at combiner A38. The detector is used to detect resulting variation of the intensity of a mix of light from first and second optical path A36, A37. In the embodiment with an n-way combiner a plurality of such mixes is formed, with different relative phase shifts between the light from the first and second optical paths A36, A37, and the intensities of these mixes are detected by different detectors. As is known per se, such detections may be used to compute relative phase changes even if the relative light intensities change. This has the advantage that intensity effects can be eliminated. Preferably the first and second optical path A36, A37 have similar average lengths, so that not much coherence is needed to ensure interference and that wavelength variations of the optical input are not misinterpreted as acoustic signals.

By using a first optical path A37 that runs over membranes over a plurality of openings A14, the vibration dependent phase changes due to membranes over different openings A14 add up. As a result, when more than one of the membranes is resonant at the same resonant frequency, the signal to noise ratio between the part of the interference signal that is due to the sound and noise generated in the device is improved compared to the use of an interferometer in which optical path A37 runs over only one membrane or measurements obtained using a ring resonator with only one optical resonator A120. In other embodiments, part or all of the membranes may be resonant at different resonance frequency. In this case the interferometer will be able to detect the effect of sound at a larger set of frequencies.

Although an embodiment has been shown wherein only first optical path A37 runs on membranes over openings A14, and second optical path A36 does not, it should be appreciated that in other embodiments second optical path A36 may runs on membranes over other openings A14. For example openings with membranes that are acoustically resonant in a first and second non-overlapping acoustic frequency bands may be used, the first optical path A37 running on membranes over the first openings but not over the second openings and the second optical path A36 running on membranes over the second openings A14 but not over the first openings. Thus, combined bandwidth detection can be realized. It may be noted that in this embodiment first optical path A37 may also contain one or more parts that do not lie on a membrane above an opening, but match the geometry of one or more parts of second optical path A36 that do lie on one or more membranes over openings A14, and vice versa. This provides for better path matching, but is not always necessary.

More generally, if membranes are used that are acoustically resonant at two or more two different resonance frequencies, the first optical path A37 second optical path A36 may run on membranes over respective sets of membranes do not share any same wavelength.

Although openings A14 are shown disposed in a row in FIGS. 3*a-c*, it should be realized that other configurations may be used, for example a matrix of rows and columns or in a non-periodic arrangement. It may be noted that, in any of the embodiments of FIGS. 3*a-c*, the sensitivity of the electronic signal to the sound may depend on the direction of the sound, with a maximum sensitivity for sound from a direction perpendicular to the surface of the device.

If it is preferred to keep the directional variation of the sensitivity small, embodiments may be used wherein ongoing optical waveguide A122, the feed optical waveguides and the output optical waveguides or the optical waveguide of the first optical path A37 of the interferometer may be used that is coupled only to a plurality of ring resonators A120 on membranes over openings A14 that are not more apart from each other than half a wavelength of the highest frequency sound that is processed in the detection system (e.g. the highest used resonance frequency of any of the membranes in the group). Many such ring resonators A120 may be used that are not more than half a wavelength of the sound apart from each other, for example at least four or at least ten. Thus a high signal to noise ration can be produced with little direction sensitivity.

Figure 3D:
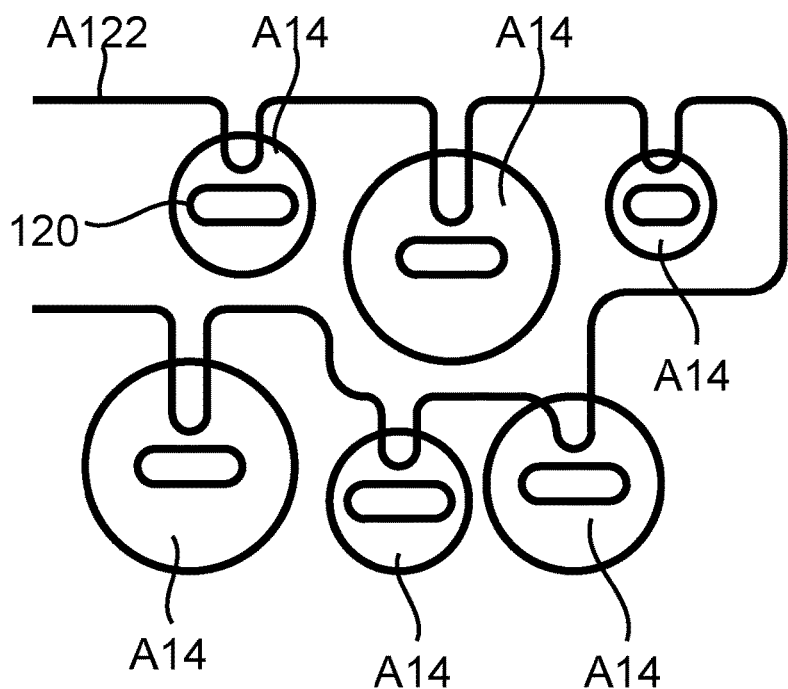

In the embodiments of each of FIGS. 3*a-c* openings A14 may be used that have the same size and shape and resonance frequency, obtained by tuning or sufficiently accurate manufacturing. This makes it easier to ensure equal optical resonance wavelengths. FIG. 3*d* illustrates an alternative embodiment like FIG. 3*a*, wherein openings A14 of different sizes are used. Openings with different sizes and shapes may be combined in the embodiments of each of FIGS. 3*a-c*. This can be used to increase the acoustic band width, with or without improved signal to noise ratio. For example membranes that are acoustically resonant at different frequencies may be used. Furthermore, as shown in FIGS. 1*e*, *f*, an optical ring resonator may be used that is formed with an optical waveguide loop that runs over the membranes of a group of a plurality of openings, which may have different shapes and size. In an embodiment a plurality of such group ring resonators may be used instead of the individual ring resonators of FIGS. 3*a,b* each group having the same variation of shapes and sizes.

Although the embodiments of FIGS. 3*a-c* and alternatives like that of FIG. 3*d* have been described for embodiments where membranes are used as acoustically resonant structures, similar arrangements may be used with other acoustic resonators, such as cantilevers etc. with optical waveguides on them instead of on membranes as described.

Arrays with Independently Readable Rows

Figure 3E:
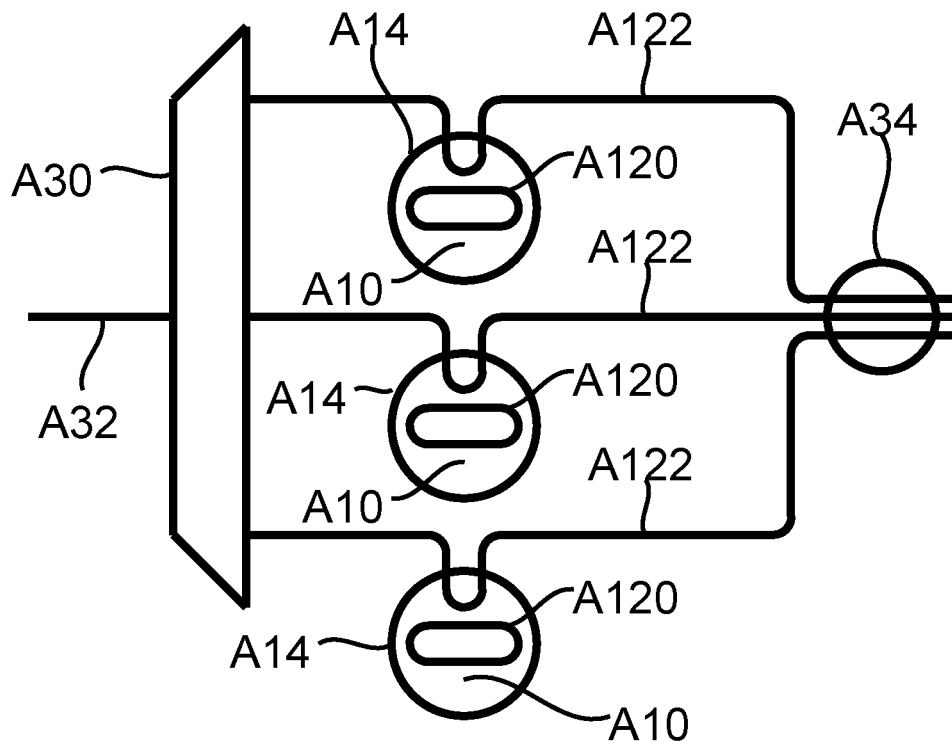

FIG. 3*e* shows an integrated optical device with a one dimensional array of acoustic-photo conversion elements, an optical input A32, an optical splitter A30 and a plurality of ongoing optical waveguides A122. Optical input A32 is coupled to an input of optical splitter A30. Optical splitter A30 has a plurality of outputs, each coupled to a respective one of the ongoing optical waveguides A122. In an embodiment optical splitter A30 may be a wavelength splitter and optical input light may be used that contains light of all of the wavelengths that are split off to different outputs of optical splitter A30. Thus the responses of each resonator can be wavelength-multiplexed onto a single fiber or waveguide via a combiner, instead of bundle A34. By way of example, a column of three acoustic-photo conversion elements is shown, each coupled to a respective one of the ongoing optical waveguides A122. But any number greater than one of acoustic-photo conversion elements may be used in the array. Each acoustic-photo conversion element comprises an optical ring resonator A120 on a membrane A10 above an opening A14 in the substrate.

Each ongoing optical waveguide A122 comprises a coupling loop that optically couples the ongoing optical waveguide A122 to the optical ring resonator A120 of the acoustic-photo conversion element on the membrane A10. Ongoing optical waveguides A122 are coupled to a bundle A34 of optical waveguides (e.g. optical fibers). Bundle A34 may be coupled to an N-fold readout device (not shown), e.g. in a photo-electronic circuit (not shown), which may be integrated separate from the integrated optical device. The integrated photo-electronic circuit may comprise N=3 photoelectric detectors coupled to respective ones of the waveguides in bundle A4, or an optical de-multiplexer followed by such a photoelectric detector. Furthermore, the separate integrated photo-electronic circuit may comprise a light source that is coupled to optical input A32.

In operation, light is supplied to optical splitter A30, which distributes split light over ongoing optical waveguides A122. The membrane A10 over openings A14 is exposed to sound, which causes vibrations of the membrane A10 over each opening A14. This in turn causes variation of the optical length of ring resonators A120 over the openings A14 and hence shifting dips in the transmission of light through ongoing optical waveguides A122 as a function of optical wavelength. Light modulated by this effect in the ongoing optical waveguides A122 is passed to one or more detectors. Thus the vibrations of the membrane as a function of time can be detected.

Figure 3F:
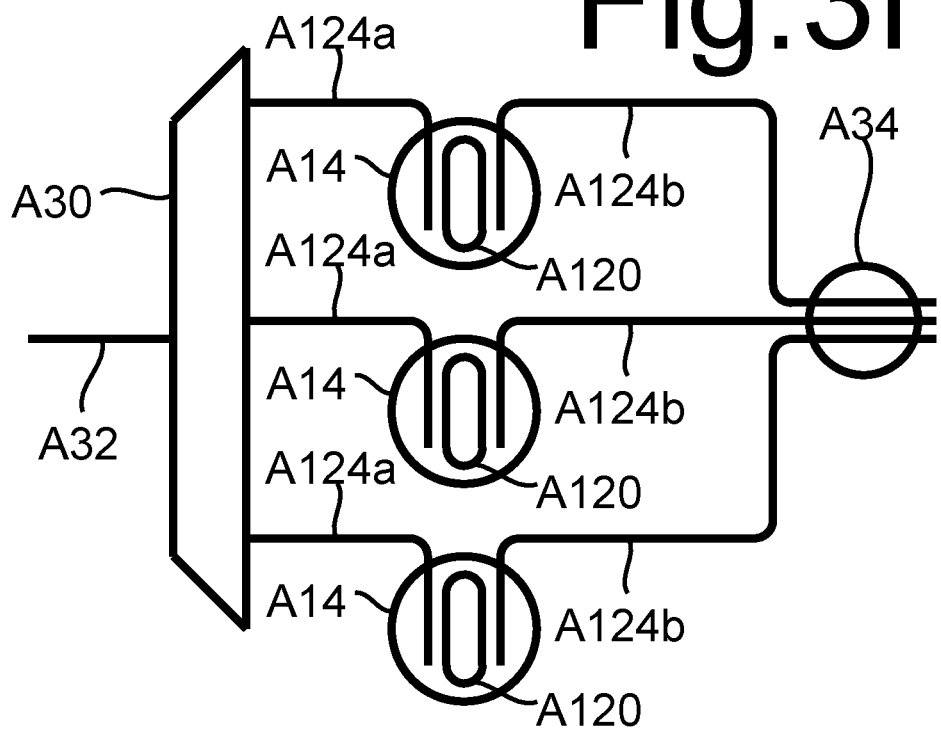

FIG. 3f shows a similar arrangement as FIG. 3e, except that couplings through ring resonators A120 is used using a feed optical waveguide A124a and an output optical waveguide A124b on opposite sides of each ring resonator A120. Herein feed optical waveguide A124a are coupled to the outputs of optical splitter A30 and output optical waveguide A124 bare coupled to bundle A34. This configuration operates similar to that of FIG. 3, except that transmission peaks are used instead of transmission dips.

Figure 3G:
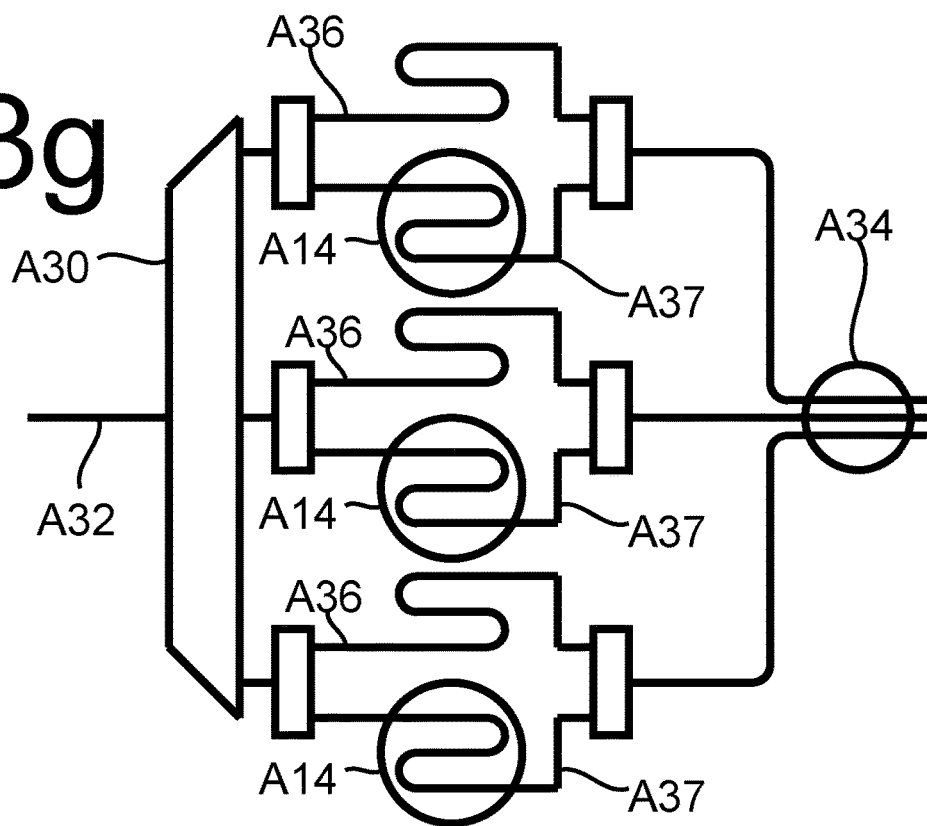

FIG. 3g shows a similar arrangement as FIG. 3e but with optical interferometers instead of ring resonators. Each optical interferometer comprises a splitter and a combiner and a first and second optical path A36, A37 between outputs of the splitter and inputs of the combiner of the optical interferometer. Although the splitters of the interferometer are shown separately from optical splitter A30, it should be noted that alternatively the function of the splitters of the interferometers can be performed by optical splitter A30.

An output of the combiner is coupled to bundle A34. Preferably the first and second optical path A36, A37 have similar average lengths. The first optical path A37 of each optical interferometer runs on the membrane over a respective one of the openings A14. The second optical paths A36 run outside the membrane over the openings A14. Preferably, the parts of the first optical paths A37 of each optical interferometer that runs on the membrane over the openings A14 is as long as possible.

For the sake of illustration FIG. 3g shows an optical path that is formed by an optical waveguide along a track that comprises a few parallel parts over the opening A14 through which the light propagates successively in spatially alternating directions. More such alternating parallel parts may be present over the opening A14, or an optical waveguide with another shape may be used. For example, an optical waveguide along a track that comprises a pair of spirals over the opening A14 wherein the light first propagates inward along a first spiral track and then continues outward through a second spiral track interleaved between successive parts of the track of the first spiral.

When light is supplied to optical input A32, mixes of light that has travelled through the first and second optical paths A36, A37 of respective ones of the interferometer are formed and supplied through bundle A34. The N-fold readout device may be used to detect variation of the intensities of the mixes as result of path length changes through the first optical paths due to vibration of the membrane over the openings A14 under influence of incoming sound. In an embodiment, each interferometer may be configured to form a plurality of such mixes, with different relative phase shifts between the light from the first and second optical paths A36, A37, and these mixes may be supplied through bundle A34.

The embodiments of FIGS. 3e-f make it possible to measure sound for different rows. As is known for phased arrays the detected sound from different rows can be combined with different delays or phase shifts to obtain directional sensitivity in different directions. Although the embodiments of FIGS. 3e-f have been described for embodiments where membranes are used as acoustically resonant structures, similar arrangements may be used with other acoustic resonators, such as cantilevers etc. with optical waveguides on them instead of on membranes as described. In other embodiments, non-resonant structures may be used.

Instead of the individual openings A14 in the embodiments of FIGS. 3e-g, groups of openings may be used, as shown in FIGS. 1e,f. Thus a better signal to noise ratio and/or a larger acoustic bandwidth can be realized. Thus the phased array may become an array of sub-arrays, wherein the effect of the sound is combined optically in the sub-arrays, with a fixed phase relation, and the combined effects of the individual arrays are detected and summed with adjustable relative delays or phase shifts. Preferably, the largest distance between the openings within each sub-array is no larger than half the acoustic wavelength of the highest sound frequency that is processed (e.g. the highest used resonance frequency of any of the membranes in the group).

It should be noted that in the embodiments of FIGS. 3d and 3e, if light at a single wavelength is supplied to optical splitter A30 to measure the vibrations of all membranes, it is desirable that the time-average resonance wavelengths of the ring resonators A120 of all acoustic-photo conversion elements should be equal (the time-average resonance wavelengths coincide with the resonance wavelengths without sound). Equal time averaged wavelengths may be realized by using an accurate manufacturing technique, or by post trimming of ring resonators A120.

Figure 4:
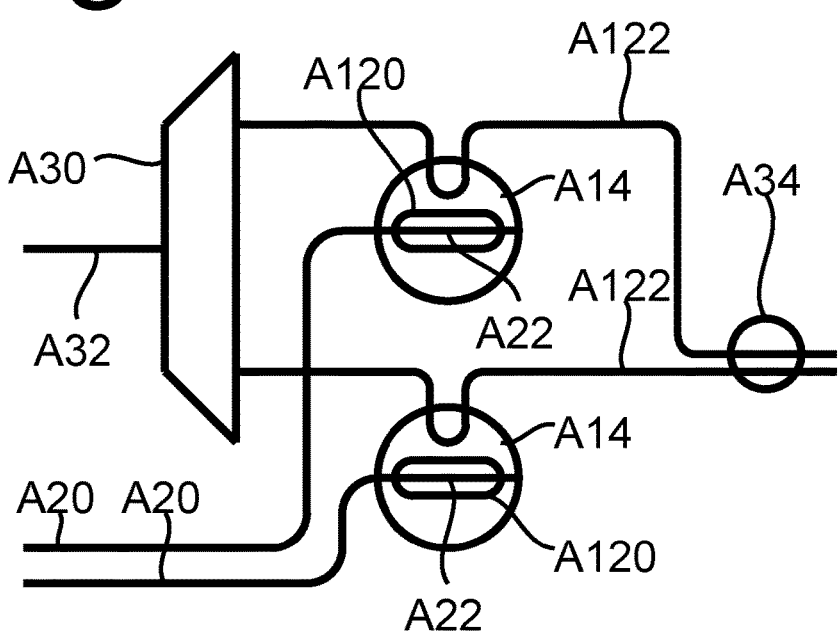
FIG. 4 shows an array with temperature controlled membranes

FIG. 4 shows an embodiment where temperature control of the membranes over all openings A14 may be used to keep the time-average resonance wavelengths fixed. A configuration as shown in FIG. 2 for each acoustic-photo conversion element, with a supply waveguide A20 for each opening A14, and a corresponding light coupling structure A22 in or under the opening A14 may be used for each opening A14. Herein a dye layer is provided on the membrane at least over the opening or at least part of the opening. A dye layer is used that absorbs light at least in a predetermined wavelength band, and/or the membrane is of a material that absorbs light at least in a predetermined wavelength band.

The photo-electronic circuit (not shown) is configured to supply light with a wavelength in that wavelength band through supply waveguides A20. The photo-electronic circuit may be configured to control the intensity of the light supplied to waveguides A20 so as to equalize the resonance wavelengths of ring resonators A120, with the wavelength of the light from optical input A32 at a flank of the transmission dip due to ring resonators A22. The photo-electronic circuit may use any suitable control method for this, e.g. using feedback from measured intensities of light from bundle A34.

Tuning of the average dip position may be performed during sound measurements, for example in a lower frequency band than the variation due to sound, or alternating with measurements. If need be a search for an initial tuning of a ring resonator A120 to a wavelength may be made before sound measurements, by applying light with a single wavelength at optical input A32 and scanning the temperature control of a membrane over an opening A14 until a dip due to the ring resonator A120 over that opening A14 is detected.

Although FIG. 4 illustrates this for two acoustic-photo conversion elements, the same may be done for more acoustic-photo conversion elements. Although FIG. 4 illustrates this for acoustic-photo conversion elements using ongoing optical waveguides A122 as shown in FIG. 1c, the same configuration of supply waveguides A20 and corresponding light coupling structures A22 may be used for other forms of resonator coupling as in FIG. 1d.

Although FIG. 4 shows the use of a plurality of supply waveguides A20, each for heating the membrane over a respective one of the openings A14, it should be realized that alternatively a single supply waveguide A20 may be used for heating membranes over a plurality of openings A14, as described in relation to FIG. 2.

FIG. 5 shows an embodiment wherein ring resonators A120 with different average resonance wavelengths are used on purpose. In this embodiment the integrated optical device additionally comprises an optical combiner A40 and an optical output A42. Optical combiner A40 has inputs coupled to ongoing optical waveguides A122 and an output coupled optical output A42. Optical combiner A40 combines the light from the through ongoing optical waveguides A122 onto optical output A42.

In the embodiment of FIG. 5 ring resonators A120 with different average resonance wavelengths are used to make it possible to distinguish measurements on the different openings A14. If ring resonators A120 have some overlapping resonance wavelengths, other resonant wavelengths of ring resonators A120 may be used, selected so that the selected resonant wavelength peak of the ring resonators A120 over none of the openings overlaps with any wavelength peak of the ring resonators A120 over the other openings.

In one embodiment wavelength division de-multiplexing may be used to distinguish measurements on the different openings A14. Herein the photo-electronic circuit transmits light with a combination of wavelengths on the flanks of the respective dips due to the ring resonators on the respective openings A14 to optical input A32, and the photo-electronic circuit uses wavelength dependent filters to separate the light at optical output A42 from the ring resonators on the respective openings A14 before detecting the intensities of this light.

In another embodiment time division de-multiplexing may be used to distinguish measurements on the different openings A14. Herein the photo-electronic circuit successively transmits light with successive wavelengths on the flanks of the dips due to the ring resonators on the respective openings A14. For each successive wavelength, the photo-electronic circuit measures the resulting intensity response or variation of the intensity response when the light with that wavelength is transmitted, so that measurements for the respective openings A14 are obtained.

Optionally, in a further embodiment, temperature based control of the membranes over all openings A14 may be used, with a configuration as shown in FIG. 2. The temperature based control can be used to tune ring resonators A120 to the wavelengths supplied by the photo-electronic circuit (e.g. by using temperature based control to shift a position on the average flank of the dip of each ring resonator A120 to a respective one of the wavelengths supplied by the photo-electronic circuit at optical input A32). Tuning of the average dip position may be performed during measurements, at the same or a different resonance wavelength, for example in a lower frequency band that the variation due to sound, or alternating with measurements. If need be a search for an initial tuning of a ring resonator to a wavelength before sound measurements may be made, by applying light with a single wavelength at optical input A32 and scanning the temperature control of a membrane over an opening A14 until a dip due to the ring resonator A120 over that opening A14 is detected.

The tuning can be used to avoid overlap between the dips due to ring resonators A120 over different openings A14 in the column, and to keep the ring resonators A120 tuned to the wavelengths of the light supplied to optical input A32.

When integrated optical device comprises a two dimensional array of acoustic-photo conversion elements a plurality of columns like those in FIGS. 3d, 3e, 3f and 4 may be used. Each column may have its own optical input A32, splitter A30 and ongoing optical waveguide A122 coupled to the acoustic-photo conversion elements of the column.

FIG. 6 shows an embodiment with an array of rows and columns of acoustic-photo conversion elements, and optional supply waveguides A20 coupled to different columns. A plurality of ongoing optical waveguides A122 are provided, each coupled to respective ones of the outputs of splitter A30. Herein, the acoustic-photo conversion elements of a plurality of columns share a single optical input A32 and splitter A30. Each row of acoustic-photo conversion elements shares an ongoing optical waveguides A122 for the row, with the ring resonators A120 of the acoustic-photo conversion elements in the row coupled to the ongoing optical waveguide A122 of the row.

Although an embodiment is shown with coupling as shown in FIG. 1c, it should be noted that a similar array can be realized with couplings as in FIG. 1d, with the outputs of splitter A30 coupled to the feed optical waveguide A124a in the first column and the output optical waveguides A124b of the columns forming the feed optical waveguide A124a in the next column, except for the last column, from which the output optical waveguides A124b are coupled to bundle A34.

When the ring resonators of all acoustic-photo conversion elements in a row as shown in FIG. 6, or a row with couplings as shown in FIG. 1d have the same resonance wavelength, the resulting modulation of the light is a product of successive modulations in the different columns. The modulation of this product is a multiplication of the modulations in the rows. If a linear approximation is allowed, this can be approximated by a sum. When the openings are distributed over an area that extends over a distance of the order of the acoustic wavelength or more, the sensitivity of the modulated signal for incoming sound will depend on the direction of the incoming sound. The sensitivity will be greatest for sound that arrives from a direction perpendicular to the surface of the acoustic-photo conversion device.

It may be desirable to measure the modulation due to sound in different columns individually. This makes it possible to realize maximum sensitivity in other directions. There are various solutions to measure the modulation due to sound in different columns individually.

FIG. 6 additionally shows optional use of supply waveguides A20 for temperature control of the membranes over all openings A14, with a configuration as shown in FIG. 2. In an embodiment, the temperature can be used as a means to improve equality of the resonance wavelengths of the ring resonators A120. In another embodiment, temperature control may be used to select the column in which the incoming sound will be enabled to modulate the light intensity of the light in ongoing optical waveguides A122. In this embodiment, the photo-electronic circuit (not shown) is configured to control the light intensities in supply waveguides A20 for different columns differently, so that only the ring resonators A120 of one column at a time are tuned to the wavelength of the light in ongoing optical waveguides A122. This makes it possible to sample measurements of sound from different columns or to enable/disable certain rows, columns and/or individual membranes. In the illustrated embodiment, each supply waveguide A20 is coupled to couplers (not shown) in or under a plurality of openings A14 of the acoustic-photo conversion elements in a respective one of the columns. The couplers may be realized as gratings on the supply waveguide A20. Alternatively, separate supply waveguides A20 may be used for individual openings A14, or optical splitters (not shown) may be used to distribute light from a supply waveguide A20 for a column over couplers in or under different openings A14 in the column.

Figure 7:
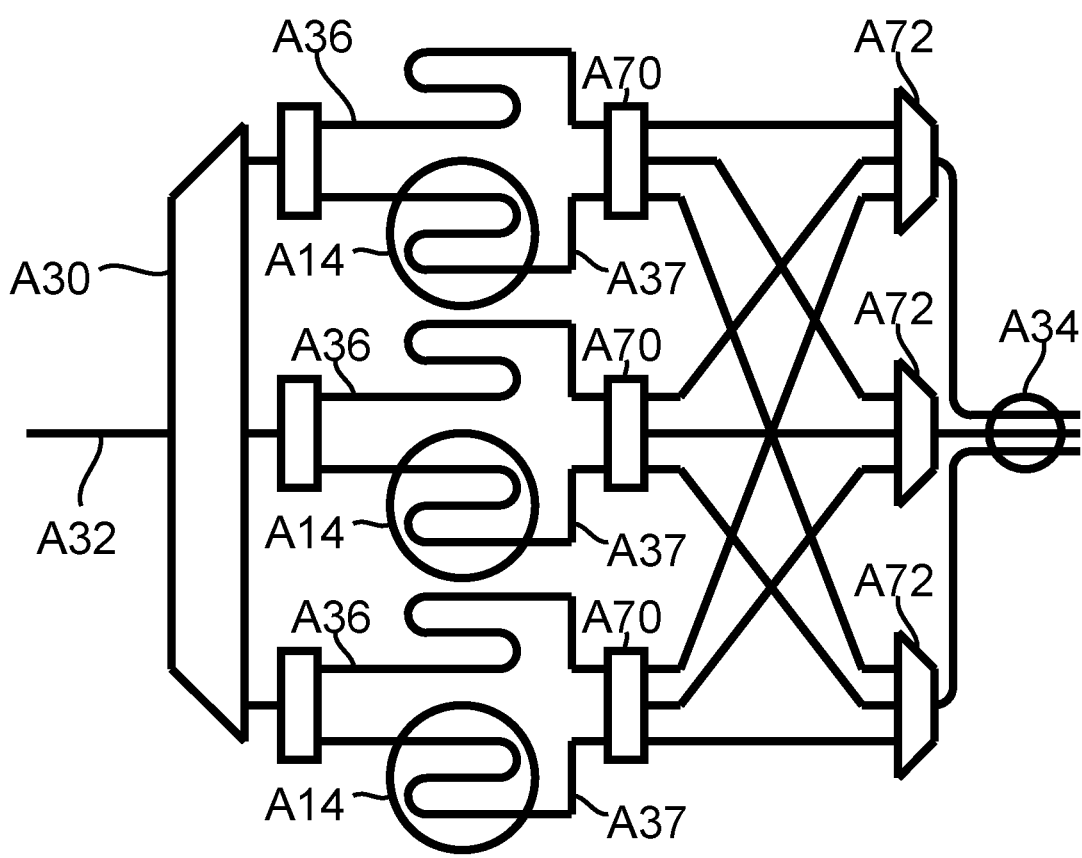
FIG. 7 shows a multiplexed array of interferometers

FIG. 7 shows an embodiment with a plurality of interferometers that use three-way couplers A70, to measure length changes in the optical paths and optical combiners A72 to combine light from the outputs of the three-way couplers A70. First output waveguides guide light from first outputs of each of the three way couplers A70 to a first one of the optical combiners A72, from second outputs of each of the three way couplers A70 to a second one of the optical combiners A72 and from a third outputs of each of the three way couplers A70 to a third one of the optical combiners A72.

In operation, a photo-electronic circuit supplies light containing multiple wavelengths (e.g. white light) to optical input A32. In this embodiment, splitter A30 is preferably a wavelength selective splitter (wavelength de-multiplexer). Splitter A30 supplies light at different wavelengths (bands) to the interferometers. Each three-way coupler A70 combines light from the first and second optical paths of a respective one of the interferometers in three different phase relations at the outputs of the three-way coupler A70. Each optical combiner A72 combines light from outputs from all different three-way couplers A70, different optical combiners A72 using different outputs of the same three-way coupler A70. Optical combiners A72 transmit the three combinations via bundle A34. In an embodiment, the splitter A30 and combiners A72 may be implemented as an Arrayed Waveguide Gratings, Planar Concave Gratings, or a network of asymmetric Mach Zehnder Interferometers to realize the wavelength division (de) multiplexing.

In an embodiment, the wavelength selectivity of splitter A30 may be realized by adding optical pass band filters (not shown) for different non-overlapping wavelength bands in series with the outputs of splitter A30, before the splitters of the interferometers. Alternatively, or in addition, such optical pass band filters may be used behind the outputs of three-way couplers A70, and/or in the optical paths of the interferometer. In an embodiment, optical combiners A72 may be selective for different wavelength (bands) at different inputs.

A photo-electronic circuit (not shown) may supply light at the different wavelengths (or in the different bands) to optical input A32. The photo-electronic circuit receives the light from the bundle and splits this received light into the wavelength components and detects the intensity of the light from for each three-way coupler A70 at the different wavelengths (bands). This yields three detected intensities for each wavelength (band), each wavelength (band) corresponding to a different interferometer. From the detected intensities, the relative phase shift between light transmitted via the first and second optical path of the same interferometers is computed. Methods of computing the relative phase shift using detected intensities of light from the interferometer paths with different relative phase shifts are known per se.

In another embodiment an interferometer may be used wherein the first optical path extends in series over the openings in a row of the array, the first optical path comprising path parts on the membranes on different ones of these openings. This makes it possible to measure the sum of the path length changes due to strain of the first optical paths due to sound at successive openings along a row. With this, the directional sensitivity for sound arriving perpendicularly to the device surface can be increased. Three way couplers and/or wavelength division multiplexing of different rows may be used in combination with these embodiments.

Photo-Acoustic Transmitters
Sideway Optic Coupling

Figure 8:
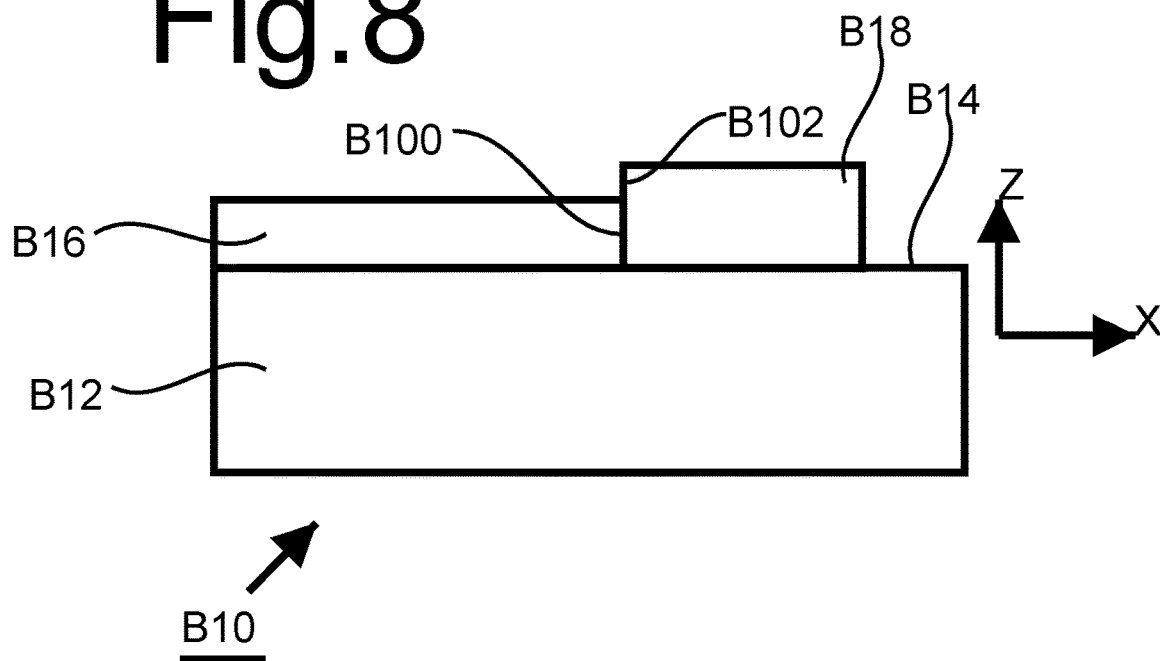
FIGS. 8, 9 show an optical waveguide coupled to a photo-acoustic transmitter
FIGS. 10a,b show a flared optical waveguide coupled to a photo-acoustic transmitter

FIG. 8 shows a side view of an embodiment of a photo-acoustic emitter device B10, comprising a substrate B12, an optical waveguide B16 and photo-acoustic conversion body B18. Photo-acoustic conversion body B18 is arranged to emit sound from the photo-acoustic emitter device B10. The photo-acoustic emitter device B10 may be an integrated photonic device, the substrate B12 being the substrate of the integrated device, on which optical waveguide B16 and photo-acoustic conversion body B18 are integrated. In the illustrated embodiment photo-acoustic conversion body B18 is shown on top of a flat part of surface, but alternatively it may be buried underneath the surface, or it may be partly, or entirely provided in an depression in substrate B12, i.e. on a surface part of the substrate that lies below the remainder of the surface B14 of the substrate, or over an opening in the surface. Similarly, optical waveguide B16 may lie in an such an opening, or buried.

Optical waveguide B16 and photo-acoustic conversion body B18 are located on the surface B14 of substrate B12. The end of optical waveguide B16 abuts to photo-acoustic conversion body B18. Photo-acoustic conversion body B18 is a volume of light-transmitting material that may be formed entirely of light-transmitting material that fractionally absorbs or comprises at least one region that fractionally absorbs the light (fractional absorption means that when light travels through the fractionally absorbing material, a fraction of the light according to an absorption coefficient is absorbed per unit length of travel and the remainder travels on; the value of the fraction is between zero and one, or may be expressed as a percentage between zero and a hundred percent; the combination of the unit length value and the value of the fraction defines a penetration depth). More specifically, an output end B100 of the optical waveguide B16 directly contacts a side surface B102 of the photo-acoustic conversion body B18, or contacts side surface B102 through an interface that substantially does not result in different light transmission (e.g. by no more than a 10% difference), when compared to a direct contact. The side surface B102 is directed transverse to the substrate surface B14.

In the illustrated embodiment the region of light-absorbing material may fill the entire volume B18. However, the light-transmitting volume B18 may comprise a separate non-absorbing region. Furthermore, the light-transmitting volume B18 may also comprise multiple distinct fractionally light-absorbing regions. Herein, distinct light-absorbing regions may refer to regions which distinct optical properties, such as distinct optical absorption coefficients, and/or distinct thermal properties, such as thermal expansion coefficients, and/or light-absorbing regions, that are separated from each other by an intermediate non or less absorbing region region. In an embodiment, the height of the light-transmitting volume in FIG. 8 along the direction perpendicular to the surface B14 of the substrate B12 is comparable to the height of optical waveguide B16 (e.g. not different by more than 50% of the height of optical waveguide B16). Thereby, the light is uniformly transmitted and/or absorbed within the light-transmitting volume and/or light-absorbing region(s). Preferably, the light-transmitting volume comprises a material with a large thermal-expansion coefficient, such as polydimethylsiloxane (PDMS). The fractionally absorbing region(s) within the light-transmitting volume B18 can advantageously be formed by modifying the material by adding an absorbing ink. For example, one may tune the optical absorption coefficient by tuning the concentration of a specific ink.

Figure 9:
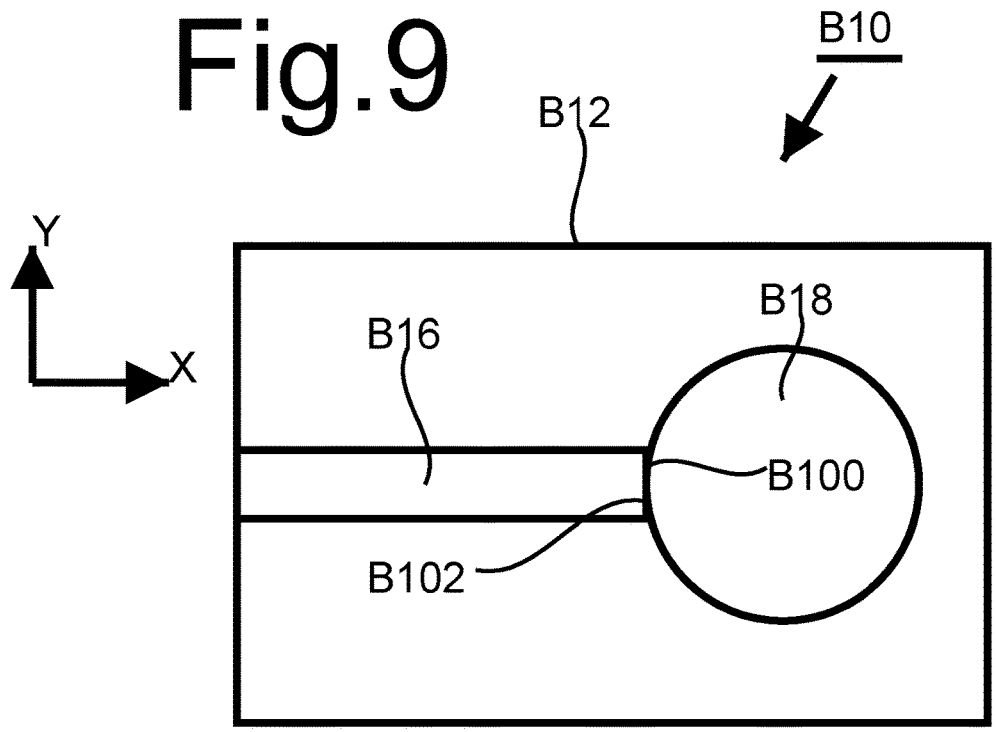

FIG. 9 shows a top view of the embodiment shown in FIG. 8. In particular, FIG. 9 shows that a cross-section of the photo-acoustic conversion body B18 with a virtual plane parallel to the substrate surface B14 is circular. The width of the waveguide B16 shown in FIG. 9 is smaller than a width of the side surface B102. However, other cross-sectional shapes are also possible.

In operation light is transmitted through the optical waveguide B16 and enters the photo-acoustic conversion body B18 from optical waveguide B16. The region of fractionally light-absorbing material will absorb light that enters the photo-acoustic conversion body B18 from the optical waveguide B16. Upon absorbing the light, the region of fractionally light-absorbing material will expand, and thereby excite an acoustic wave.

If a light pulse is used, the wavelength (band) of the excited acoustic wave is, inter alia, determined by the height of the light-absorbing region and the cross-section size of the acoustic conversion body B18. In the embodiment wherein the acoustic conversion body B18 is formed entirely of fractionally light-absorbing material, the phase of the excited acoustic wave is substantially independent of position along the surface of substrate B12, because the light velocity is much higher than that of sound. If the width of photo-acoustic conversion body B18 is smaller than the acoustic wavelength and more particularly less than half the acoustic wavelength, the acoustic radiation pattern will be more or less omnidirectional. If the width of photo-acoustic conversion body B18 is much larger the main lobe of the acoustic radiation pattern will be substantially perpendicular to the surface B14 of the substrate B12.

Flared Optical Coupling

Preferably, in order to ensure efficient sound generation, the size of the acoustic conversion body B18 is not much smaller than half the acoustic wavelength, i.e. larger than the typical width of an integrated optical waveguide B16 of a integrated photonic circuit, which may be less than a few optical wavelengths.

FIGS. 10a and 10b show a top view of two other embodiments of a photo-acoustic emitter device B10, wherein the integrated optical waveguide B16 is mainly much smaller than that of the acoustic conversion body B18. The width of the optical waveguide B16 shown in FIGS. 10a and 10b flares out towards the photo-acoustic conversion body B18. Specifically, the optical waveguide includes a base part B306 which has a constant width that is smaller than a width of the side surface of the photo-acoustic conversion body B18. Base part B306 may be the final part of an optical waveguide along a route to the photo-acoustic conversion body B18. and Furthermore, the optical waveguide B16 has a widening part B304 between the base part B306 and the side surface B102 the photo-acoustic conversion body B18. The widening part B304 widens from the width of the base part B306 of the optical waveguide B16 to the width of the side surface of the photo-acoustic conversion body B18. In other words, the optical waveguide B16 is flared.

Viewed in the direction perpendicular to the surface of substrate surface B12 the cross-section of the photo-acoustic conversion body B18 B18 is circular-shaped in FIG. 10a and square-shaped in FIG. 10b. However, other shapes are also possible. For example, a triangle shape, or another polygon shape is possible.

The flaring improves illumination of photo-acoustic conversion body B18 when the cross-section size of photo-acoustic conversion body is larger than the width of first part B306 of optical waveguide B16. This can for example be useful to uniformly illuminate a larger volume of photo-acoustic conversion body B18, for which the cross-section size in the plane parallel to the substrate surface B14 is relatively large compared to the thickness of the volume B18, i.e. the extension of the volume in the direction perpendicular to the substrate surface B14. This can be advantageous for the efficient generation of an acoustic wave and optionally to increase the directivity of the acoustic radiation pattern.

Figure 11:
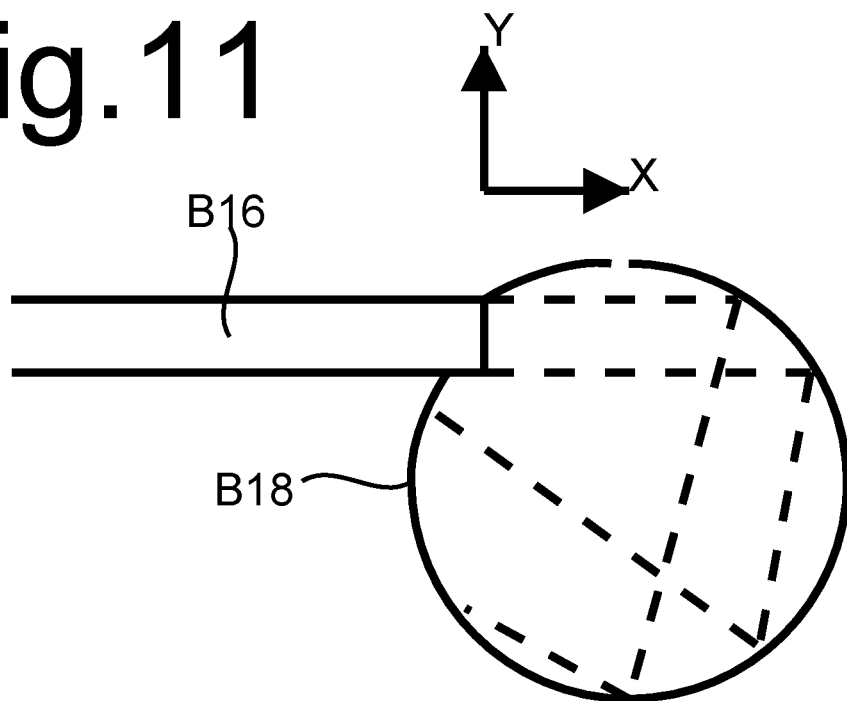
FIG. 11 shows an internal light reflection of a photo-acoustic transmitter

FIG. 11 shows a top view of further embodiments of a photo-acoustic emitter device B10, wherein the photo-acoustic conversion body B18 is configured to provide for multiple internal optical reflection of light from optical waveguide B16 on non-parallel parts of the perimeter acoustic conversion body B18. The required reflection may be provided by surrounding photo-acoustic conversion body B18 at least along its lateral circumference with material with a different index of refraction, or by means of a reflective coating on the perimeter of photo-acoustic conversion body B18.

When the perimeter of the photo-acoustic conversion body B18 is specularly reflective, multiple internal optical reflection can be achieved using a perimeter shape that provides for reflection of incident light from a non-perpendicular angle of incidence to a different part of the perimeter and so on, so that multiple reflections of the light from the perimeter will occur successively. The light from the optical waveguide B16 is directed through the photo-acoustic conversion body B18 at an non-perpendicular angle to the perimeter, so that successive reflections occur. Instead a diffusely reflective perimeter may be used, e.g. by using a roughened perimeter or a diffusely reflective coating.

In the embodiment of FIG. 11 waveguide B16 may be arranged on top of a surface B14 of a planar substrate. The end of waveguide substantially contacts a photo-acoustic conversion body B18 of circular cross-section, which may be formed entirely of fractionally light absorbing material. The orientation of the longitudinal axis of optical waveguide B16 at the location where it contacts acoustic conversion body B18 forms a non zero angle with the radius of photo-acoustic conversion body B18 at that location. Preferably, the refractive index of the photo-acoustic conversion body B18 is higher than the surrounding environment, and the angle is chosen so that internal reflection occurs where light from the optical waveguide reaches the perimeter of photo-acoustic conversion body B18 through the photo-acoustic conversion body B18. Alternatively, one may apply a reflective coating on the side surface B122 of the volume B18, thereby confining the light.

As a result, light entering the photo-acoustic conversion body B18 from the waveguide B16 travels throughout the photo-acoustic conversion body B18 by multiple internal reflections on the perimeter of photo-acoustic conversion body B18, as is illustrated with the arrowed light path B408 in FIG. 11.

Although FIG. 11 depicts a photo-acoustic conversion body B18 with a circular cross-section in the plane parallel to the substrate B12, it is noted that other shapes are also possible. Preferably, the geometry, as well as the angle of incidence of the waveguide B16 on the volume is chosen such that the light uniformly illuminates the entire photo-acoustic conversion body B18. This can also be achieved by choosing a geometry with little symmetry, either by choosing a suitable angle and/or by having a volume B18 that has a non-symmetric shape.

Figure 12:
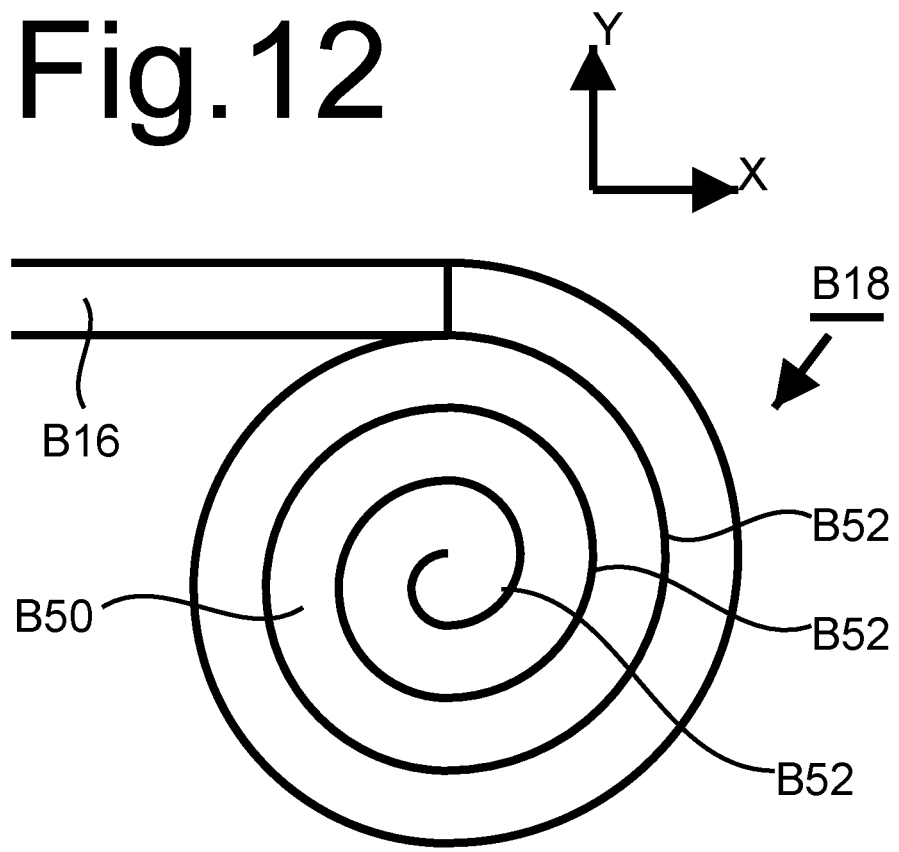
FIG. 12 shows a spiral optical waveguide that forms a photo-acoustic transmitter
FIGS. 13a,b show multiple optical waveguides coupled to a photo-acoustic transmitter

FIG. 12 shows a top view of another embodiment of a photo-acoustic emitter device. An optical waveguide B16 is arranged on a substrate surface of a substrate. The waveguide B16 is directly coupled to photo-acoustic conversion body B18. The photo-acoustic conversion body B18 is provided with an optical separation B52 that separate photo-acoustic conversion body B18 into parts of a further optical waveguide B50 along a path that spirals inwardly. Optical separation B52 can, for example, be made by a spiral-shaped walls for which the refractive index is lower than in the part of separate photo-acoustic conversion body B18 that forms further optical waveguide B50, or by a reflective material.

Such a spiral shape allows one to create a large effective sound-emitting surface. Because the light velocity in the spiralling further optical waveguide B50 of the photo-acoustic conversion body B18 is much higher than the sound velocity, sound with substantially the same acoustic phase is excited everywhere along the spiralling further optical waveguide B50. Thus the spiralling further optical waveguide B50 acoustically effectively acts as a single sound generator with the overall diameter of the spiral. At the same time an even light distribution is realized, because the width of the individual windings of the spiralling further optical waveguide B50 is smaller than the overall diameter.

As illustrated, the width of the individual windings of the spiralling further optical waveguide B50 may be constant along the spiral path. In a further embodiment, the width of the individual windings of the spiralling further optical waveguide B50 may vary with position along the spiral. This makes it possible to create a specific radial acoustic excitation intensity pattern. For example, the width of one or inner windings may be smaller than that of one or more outer windings, so that the absorption in the center of the spiral is enhanced to obtain a desired acoustic excitation pattern, such as a Gaussian pattern.

As shown in FIG. 12, the width of the waveguide B16 equals that of spiralling further optical waveguide B50 at its input. Alternatively different widths may be used, optionally with a flaring as in FIGS. 10a,b. In an embodiment, the optical separation B52 can be made of a material with acoustically similar properties like those of the further optical waveguide B50, and/or be so thin that it does not significantly affect lateral sound travel.

Instead of a spiral a plurality of concentric acoustic conversion bodies may be used, for example a central circular acoustic conversion body and a ring shaped acoustic conversion body around the central circular acoustic conversion body (both in the same plane parallel to the substrate surface). Optionally a series of shaped acoustic conversion bodies may be used in this plane, each ring in the series around the previous ring in the series or the central circular acoustic conversion body. In this embodiment a plurality of optical feed waveguides may be used, each optically coupled to a respective one of the central circular acoustic conversion body and the one or more ring shaped acoustic conversion bodies.

By controlling the relative optical intensities of light from the optical feed waveguides the shape of the emitted acoustical beam can be controlled. Different optical intensities may be used to generate sound with relative amplitudes that depend on radial distance from the center of the set of concentric bodies. The shape of the emitted acoustical beam can be varied by varying the relative intensities of the light from the optical feed waveguides, e.g. under control of an electronic control circuit.

A common input optical waveguide and an optical splitter coupled between the common input optical waveguide and the plurality of optical feed waveguides may be used to feed the central circular acoustic conversion body and the one or more ring shaped acoustic conversion bodies from the common input optical waveguide.

In an embodiment, the optical splitter may be configured to provide for predetermined different relative optical intensities in the different optical feed waveguides, so as to provide predetermined intensity ratios between the optical intensities in the central circular acoustic conversion body and the one or more ring shaped acoustic conversion bodies. This can be used to set the acoustic beam shape. Instead of, or in addition to, using the optical splitter for adjusting the relative intensities, optical attenuators in (or in series with) the different optical feed waveguides may be used for this purpose.

In another embodiment the splitting ratios of the optical splitter and/or the attenuation factors of the optical attenuators may depend on the optical wavelength. In this case the beam shape may be controlled by controlling the relative intensity of light of different wavelength in the common input optical waveguide. A similar control may be used to control beam shape from non-concentric arrays of acoustic conversion bodies, such as linear arrays or matrix arrays with rows and columns of acoustic conversion bodies.

In an embodiment the optical feed waveguides lie on the same plane as the central circular acoustic conversion body and the one or more ring shaped acoustic conversion bodies. In this embodiment the optical feed waveguides may pass through openings in the one or more ring shaped acoustic conversion bodies to reach their target body, the light being coupled into the ring(s) in a direction along the rings, e.g. via a reflector. In other embodiment the optical feed waveguides lie in a different plane from the central circular acoustic conversion body and the one or more ring shaped acoustic conversion bodies. In this embodiment one or more couplers may be used to couple each of the central circular acoustic conversion body and the one or more ring shaped acoustic conversion bodies to a respective one of the optical feed waveguides. Alternatively different optical feed waveguides may extend under different ones of the acoustic conversion bodies and evanescent coupling may be used between the optical feed waveguides and the acoustic conversion bodies.

Figure 13A:
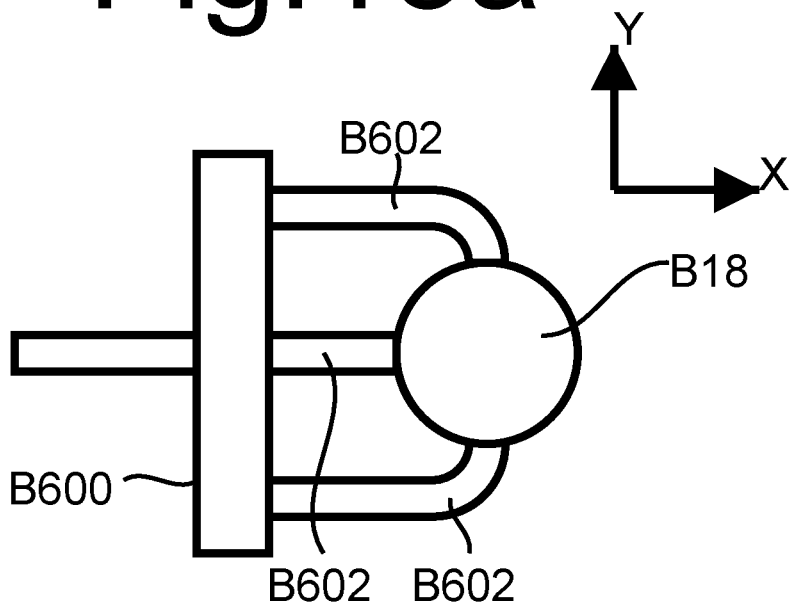

FIG. 13a shows illustrates an embodiment of the device wherein the device comprises an optical waveguide B16, an optical splitter B600, a plurality of waveguides B602 and a photo-acoustic conversion body B18 on the substrate (not shown). The waveguide B16 is connected to an input of optical splitter B600. The outputs of the optical splitter B600 are connected to the waveguides B602 that each route light to a different location on the side surface of a photo-acoustic conversion body B18 along its circumference. This provides for a better distribution of light to photo-acoustic conversion body B18. The output of each of the plurality of waveguides may be directly optically coupled to the side surface B102 or via an interface layer. Although three waveguides B602 are shown, it should be understood that more or less may be used.

Figure 13B:
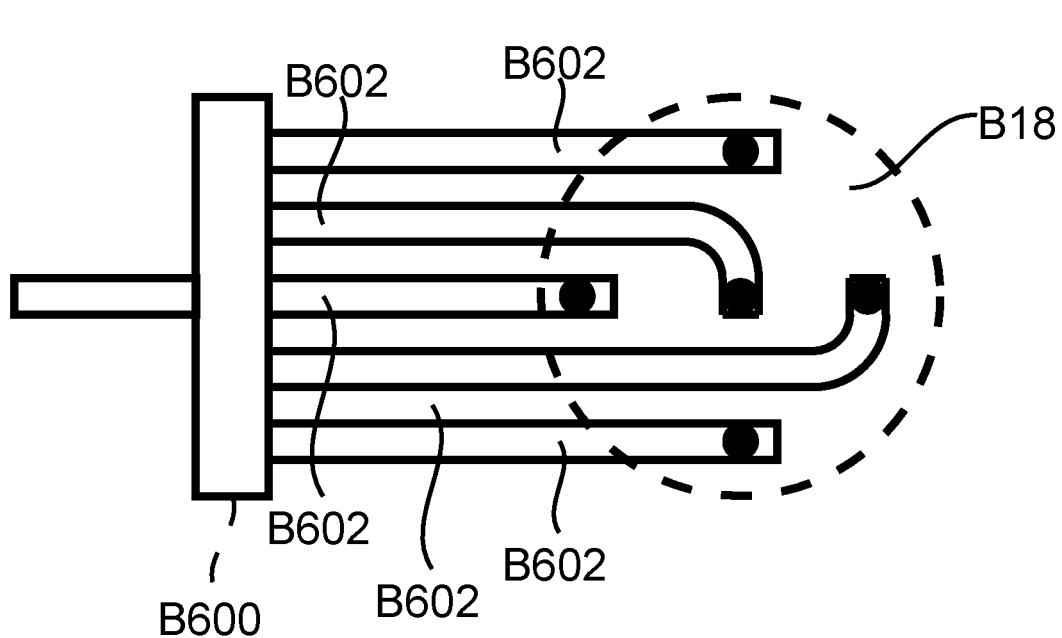

FIG. 13b shows a schematic view of another embodiment of a photo-acoustic emitter device. The device comprises an optical waveguide B16 on a substrate (not shown). The waveguide B16 is connected to an input of an optical splitter B600. The outputs of the optical splitter B600 are connected to a plurality of waveguides B602 that each route to a location on or under a photo-acoustic conversion body B18 on the substrate. Although five of waveguides B602 are shown, it should be understood that more or less may be used. The plurality of waveguides B602 may be optical waveguides arranged on an optical circuit underneath and/or over photo-acoustic conversion body B18. As an alternative optical fibers could be used. By arranging the locations to which the plurality of waveguides B602 are routed in a distributed pattern, sound excitation can be better distributed over the photo-acoustic conversion body B18. By selecting the density of the locations, it is possible to tune the acoustic excitation profile. For example, the number of waveguides per unit area in the center may be larger than the number of waveguides per unit area outside the center. As another example, the splitter may have a specific non-uniform distribution over the output waveguides.

FIG. 14 shows three embodiments of a photo-acoustic emitter device B10. The device is provided with a coupling structure B702a for directing light travelling inside the waveguide B16 towards the photo-acoustic conversion body B18.

Figure 14A:
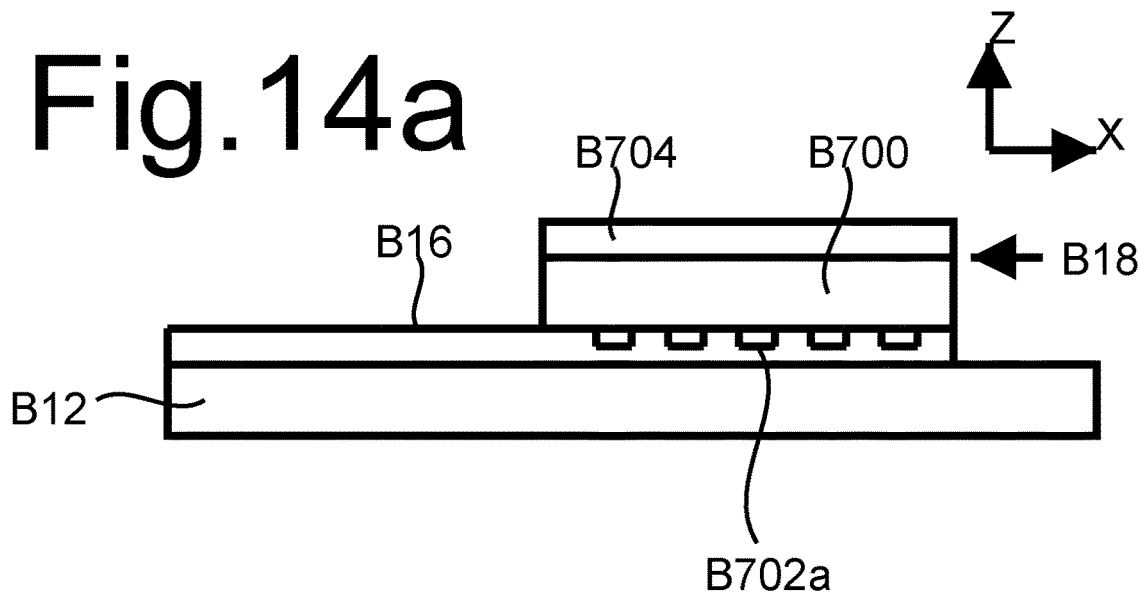
FIG. 14a-c show vertical light coupling structures

FIG. 14(a) shows a side view of an embodiment wherein the waveguide B16 is placed below the photo-acoustic conversion body B18. The waveguide B16 is arranged on the surface B14 of a planar substrate B12. The coupling structure is provided as a grating B702a on the waveguide B16. The grating B702a diffracts light from the waveguide B16 in an upward direction into the photo-acoustic conversion body B18 that is arranged above the grating B702a. The precise angle under which light within the waveguide B16 is diffracted out of the waveguide B16 depends on the spacing of the grating coupler B702a and the wavelength of the light travelling inside the waveguide B16. It is noted that this aspect can be combined with the embodiments shown the preceding figures. In particular, the waveguide B16 may be flared, such that light is directed upwardly over a relatively wide waveguide B16. Similarly, the waveguide B16 may be spiral-shaped with a grating coupling and a light-transmitting volume B18 on top. In the illustrated embodiment The photo-acoustic conversion body B18 comprises a fractionally light-absorbing layer B704 above the grating B702a, and a non-absorbing layer 700, or at least less absorbing layer, at least part of which extends between the grating B702a and the fractionally light-absorbing layer B704. In another embodiment, photo-acoustic conversion body B18 be formed entirely of fractionally light-absorbing material.

Figure 14B:
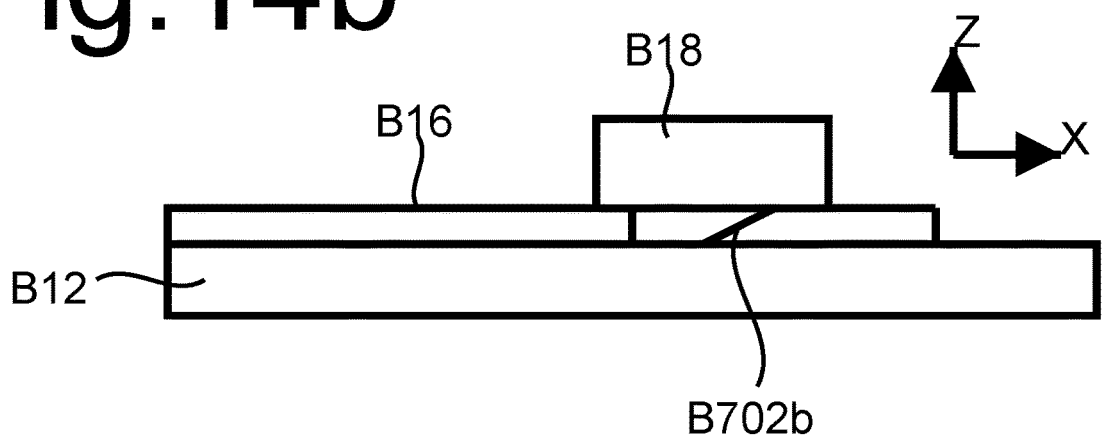

FIG. 14(b) shows a side view of an alternative embodiment of a photo-acoustic emitter device comprising an optical waveguide B16, a photo-acoustic conversion body B18 and a mirror B702b. The optical waveguide B16 is arranged to couple out light to mirror B702b and mirror B702 is configured to reflect the light to the photo-acoustic conversion body B18. In the shown embodiment, the entire volume B18 is fractionally light-absorbing, but alternatively a combination of an absorbing and non-absorbing layer may be used. In operation, a light pulse fed to the input of the optical waveguide B16 is output at the other end of the optical waveguide B16 and is then directed upwardly by the mirror B702b. The mirror B702b may make an angle of 45° relative to the substrate surface B14. It is noted that other angles are also possible.

Figure 14C:
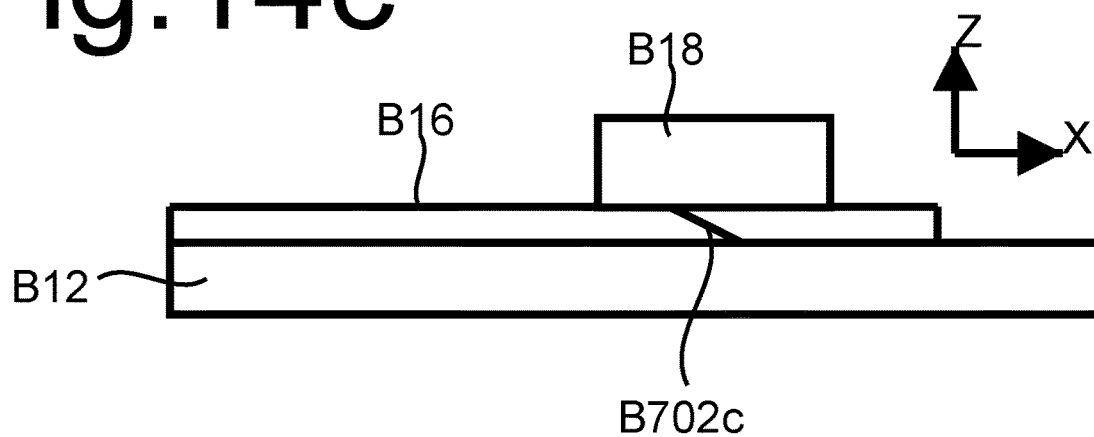

FIG. 14(c) shows a side view of another embodiment of a photo-acoustic emitter device comprising an optical waveguide B16 than ends in an oblique facet 702c, and a photo-acoustic conversion body B18. The facet may be an etched facet B702c e.g. at an angle of 45°. photo-acoustic conversion body B18 is above the etched facet B702c. In the illustrated embodiment, photo-acoustic conversion body B18 is completely formed by fractionally light-absorbing material. In operation light travelling through the waveguide is redirected upwardly by the facet B702c. In an embodiment, all of the light is due to internal reflection. In addition the surface of the etched facet may be provided with a reflective coating to enhance the reflection, or the entire reflection may be provided by such a coating.

It is noted that the coupling structures B702a-B702c do not need to direct the light exactly perpendicularly to the substrate surface B14. Put differently, the light may couple out of the waveguide B16 at an angle different from 90° to the surface of the substrate B18. This may, for example, be achieved by etching a facet or mirror at an angle different from 45°. For a grating coupler the angle under which light is coupled out of the waveguide can be altered by tuning the spacing of the grating relative to the optical wavelength.

FIG. 15 shows another embodiment of a photo-acoustic emitter device. In this embodiment the device the optical waveguide B16 spirals inwardly. The acoustic conversion body B18 (shown by a dashed circle) is arranged on top of or under the inwardly spiralling optical waveguide B16. Instead of the optical waveguide B16 with a spiral trajectory, other optical waveguide trajectories may be used that increase the length of the optical waveguide in an area underneath or on top of the acoustic conversion body B18 compared to a waveguide that runs straight through the area. For example a wavy trajectory may be used, wherein the optical waveguide runs back and forth a plurality of times between opposite edges of the area.

Light from the optical waveguide may be coupled to the acoustic conversion body B18 in any way or combination of ways. Examples of ways of coupling light include the use of coupling structures along the trajectory and use of evanescent coupling of light between the optical waveguide B16 and the acoustic conversion body.

As illustrated in FIG. 15, a plurality of coupling structures B702 may be provided arranged at a plurality of different locations along the trajectory of the optical waveguide B16 underneath or on top of the acoustic conversion body B18. These coupling structures B702 are arranged for directing fractions of light from the waveguide B16 into the acoustic conversion body B18 at the different locations into different sub-regions of the photo-acoustic conversion body. The coupling structures can be implemented as gratings on the optical waveguide B16, or the light may be coupled to the acoustic conversion body B18 using taps, i.e. branches from the inwardly spiralling optical waveguide B16 to which a fraction light is split off from the inwardly spiralling optical waveguide B16 and which include structures like mirrors, facets, gratings or use evanescent coupling of light to direct the fraction of light to the acoustic conversion body B18.

The fractions of light that are coupled to the acoustic conversion body B18 and the positions where this is done may be selected to provide for even illumination of the acoustic conversion body B18, or to provide a selected illumination pattern, e.g. on average a Gaussian pattern. Different gratings or taps may be configured to supply different fractions of the intensity of the light in the optical waveguide B16. The positions of the gratings or taps may be evenly distributed. Alternatively the positions may be selected to vary the spatial concentration of gratings or taps.

Evanescent coupling of light can be promoted by placing the core of the optical waveguide B16 close to the acoustic conversion body B18 and/or by using a narrow optical waveguide and/or using sharp bends in the trajectory of the optical waveguide B16. It may be noted that the radius of curvature of the optical waveguide near the center of the spiral is lower than the radius of curvature at an outer part of the spiral. The smaller the radius of curvature, the larger the evanescent fraction. Hence, the inwardly spiralling waveguide B16 that is evanescently coupled to the acoustic conversion body B18 can advantageously be used to create an acoustic wave for which the intensity in the center is higher than in the outer part.

Figure 16:
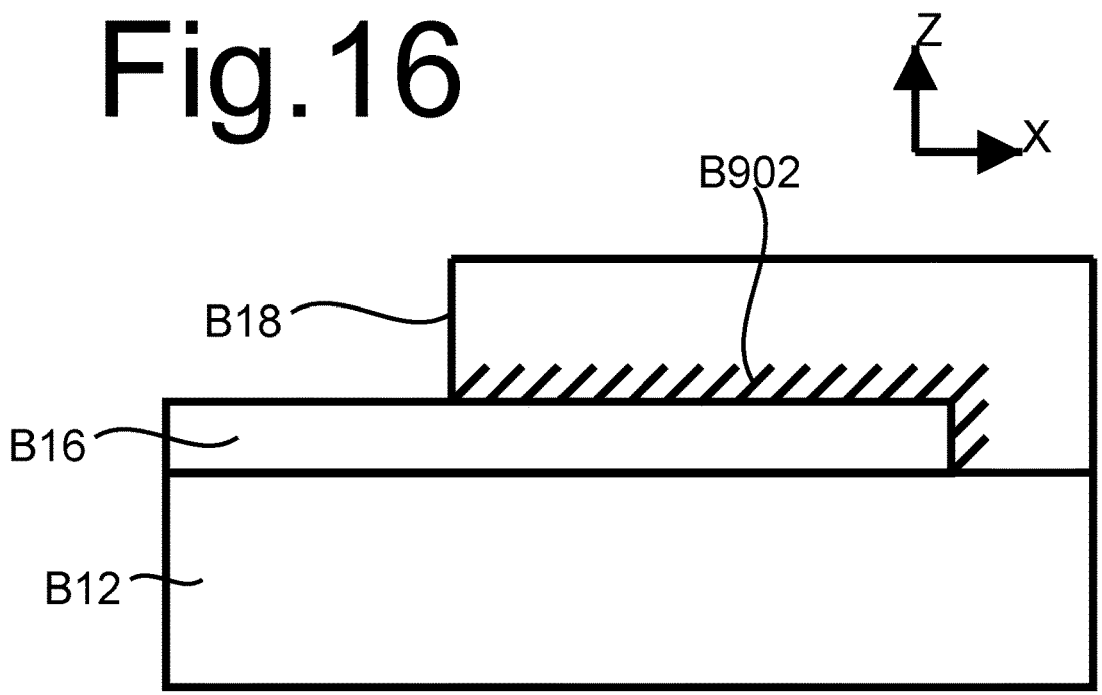
FIG. 16 shows a photo-acoustic transmitter that uses evanescent light coupling

FIG. 16 illustrates evanescent coupling in general (not specifically for the spiral). The figure shows a side view of an embodiment of a photo-acoustic emitter device, comprising a substrate B12, an optical waveguide B16 and photo-acoustic conversion body B18. The optical waveguide B16 is arranged on the planar surface of the substrate. The photo-acoustic conversion body B18 is provided over the optical waveguide B16 and at least partly surrounding it. Optionally a thin interface layer (not shown) may be present between the photo-acoustic conversion body B18 and the optical waveguide B16.

Optical waveguide B16 is made of an optically transparent material that has a first index of refraction. Photo-acoustic conversion body B18 (or the interface layer) is made of a different material that has a second, different index of refraction, so that in the ray approximation light is internally reflected within optical waveguide B16. However, as is known per se, the electromagnetic field amplitude associated with the light is not zero outside the transparent material of such an optical waveguide B16. Rather, it decays exponentially outside the transparent material. Thus, the light travelling through the waveguide B16 causes an electromagnetic field amplitude outside the waveguide B16. The external field, in the so-called evanescent tail, can be absorbed by a light-absorbing region within the photo-acoustic conversion body B18. In FIG. 16 the evanescent tail is depicted with the shaded region B902. The photo-acoustic conversion body B18 may be relatively thin, as the evanescent tail may be relatively short.

The amplitude of the electromagnetic field in the evanescent tail in the photo-acoustic conversion body B18 can be increased by exciting higher-order modes in the optical waveguide B16, which typically have a longer evanescent tail. The amplitude can also be increased by narrowing the width of the optical waveguide B16, as this increases the amplitude of the evanescent fraction. Similarly bends in the trajectory of the waveguide B16 may be used to increase the amplitude of the evanescent fraction. Furthermore, use of a plurality of optical waveguides close to each other may be used to increase the amplitude of the evanescent fraction.

Furthermore, one may increase the evanescent fraction by having a larger ambient index of refraction outside the material of the optical waveguide B16. Hence, it may be beneficial if the photo-acoustic conversion body B18 comprises material with a high refractive index.

Figure 17:
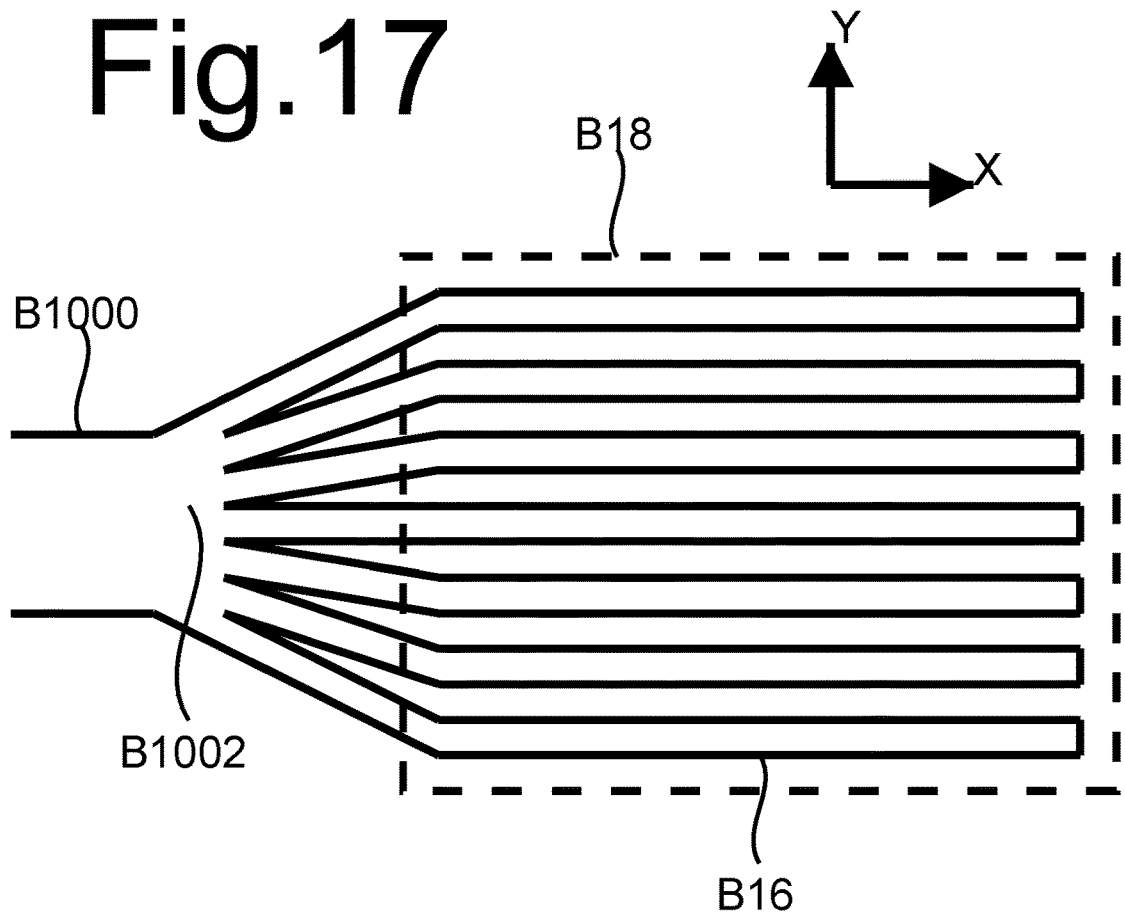
FIG. 17 shows an evanescent light coupler of a photo-acoustic transmitter

FIG. 17 shows a top view of a further embodiment of a photo-acoustic emitter device wherein a plurality of narrow, closely spaced optical waveguides B16 (only one labeled) is used to increase evanescent coupling. The device shown in the figure comprises an input optical waveguide part B1000 that is split by an optical splitter B1002 into a plurality of parallel optical waveguides B16. A photo-acoustic conversion body B18 above or below the plurality of parallel optical waveguides B16 is indicated by a dashed rectangle. The plurality of parallel optical waveguides B16 evanescently couple light out of the plurality of waveguides B16 into the surrounding photo-acoustic conversion body B18. The distance between the parallel optical waveguides B602 is configured such that the evanescent tails of neighbouring optical waveguides B16 overlap. The small mutual separation thus increases the amplitude light in the photo-acoustic conversion body B18. Furthermore, the evanescent fraction is increased because the parallel optical waveguides B16 are narrower than the input optical waveguide part B1000 via which the light is supplied to the parallel optical waveguides B16.

It is further noted, that the embodiments shown in FIGS. 15 and 17 can be combined. That is, the inwardly spiralling part of the waveguide shown in FIG. 15 may also correspond to a plurality of mutually parallel waveguides that spiral inwardly and are connected to a common input waveguide by an optical splitter.

Locally the absorption can be increased within the shown embodiment by having narrow waveguides, a small mutual separation and/or a tight bend. Conversely, the absorption can be lowered by having wider waveguide, a larger mutual separation and/or a slow bend. This allows one to create a specific acoustic wave shape, for example, a Gaussian-like acoustic wave shape.

Multilayer Photo-Acoustic Transmitters

Temporal Spreading

Figure 18:
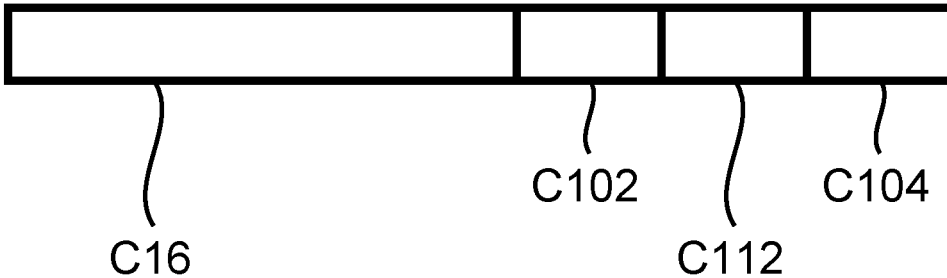
FIGS. 18, 19 show a multilayer photo-acoustic transmitter
FIGS. 20a,b show a photo-acoustic transmitter with regions of different width

FIG. 18 shows a first embodiment of a photo-acoustic converter emitter device C10. In this embodiment device C10 includes an optical waveguide, for example an optical fiber C16. The output of the optical fiber C16 is directly coupled to a light-to-sound conversion structure. The light-to-sound conversion structure comprises a first photo-acoustic conversion region C102 of fractionally light-absorbing material and a second photo-acoustic conversion region C104 of fractionally light absorbing material. In the illustrated embodiment an intermediate region C112 is provided between the first and second photo-acoustic conversion regions C102, C104 intermediate region C112 is transparent, or at least has a smaller light absorption coefficient than the first and second photo-acoustic conversion regions C102, C104. The first and second photo-acoustic conversion regions act as distinct photo-acoustic conversion regions at least because they are separated by intermediate region C112.

In operation, a light pulse is supplied to optical fiber C16 and the light pulse travels along a light transmission path that successively includes the first photo-acoustic conversion region C102, the intermediate region C112 and the second photo-acoustic conversion region C104 in the light-to-sound conversion structure. The light-to-sound conversion structure is part of a sound transmission path along which sound generated in the first and second photo-acoustic conversion region C102, C104 travels to the right in the figure. Sound generated in the first photo-acoustic conversion region C102 travels in this sound transmission path along or through the intermediate region C112 and the second photo-acoustic conversion region C104.

Upon receiving light through the optical fiber C16, the first photo-acoustic conversion region C102 and the second photo-acoustic conversion region C104 will absorb part of the energy of the light, as a result of which the photo-acoustic conversion regions C102 and C104 will expand and generate an acoustic wave. In the illustrated embodiment, this can for example be achieved by feeding a laser pulse to an input of the optical fiber C16. As the speed of light is much larger than then speed of sound, one may assume that, for their effect of sound generation, the first and second acoustic wave from the first and second photo-acoustic conversion regions C102 and C104, respectively, are generated substantially at the same time instant. The wave front of the first acoustic wave and the wave front of the second acoustic wave will be separated spatially approximately by the length of the intermediate region C112 along the sound transmission path C108. Thus an optical pulse travelling through the waveguide C16 will generate a so-called acoustic pulse train.

It is noted that more than two photo-acoustic conversion regions may be used. For example, one may provide a stack of photo-acoustic conversion regions arranged on a single light path originating form the optical fiber. By spacing the photo-acoustic conversion regions, with intermediate regions of transparent material, or material that has a lower absorption coefficient, a longer acoustic pulse train may be generated using a single optical pulse.

Furthermore, the relative values of the absorption coefficient in the photo-acoustic conversion regions and/or the relative lengths of the photo-acoustic conversion regions may be selected to obtain specific effect. For example, when the photo-acoustic conversion regions are formed by doping a volume of PDMS with ink, the ink concentration can be selected to set the absorption coefficient. For example, the absorption coefficient may be selected in such a way that the acoustic waves in each of the photo-acoustic conversion regions have substantially the same amplitude. This may be achieved by using a material that has a lower absorption coefficient in the photo-acoustic conversion region(s) that are closer to the input of the optical waveguide (such as first photo-acoustic conversion region C102) than in photo-acoustic conversion region(s) that are further from the input of the optical waveguide (such as second photo-acoustic conversion region C104), or using a shorter photo-acoustic conversion regions instead of, or in addition to, using a lower absorption coefficient, such that each of the photo-acoustic conversion regions absorbs approximately the same amount of light.

Figure 19:
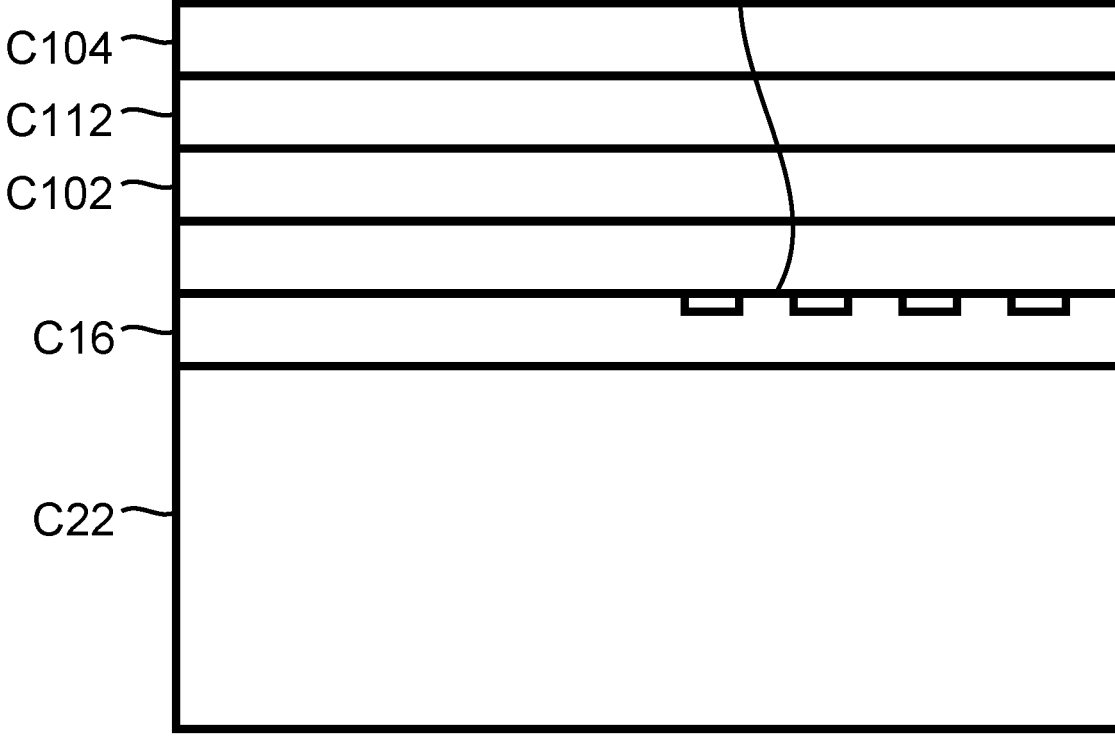

FIG. 19 shows a side view of a photo-acoustic emitter device C10. A waveguide C16 is shown through which light can travel. The shown waveguide C16 is arranged on a surface of a planar substrate C22. The device further comprises a coupling structure C26, herein embodied by a grating C26 in the waveguide C16. Such a coupling structure C26 at a specific location along the waveguide C16 locally couples light out of the waveguide C16 in an upward direction. Here, an upward direction corresponds to a direction with a component perpendicular to the substrate surface. On top of the waveguide C16 and/or the surface of substrate C22 a light-to-sound conversion structure is arranged. The conversion structure is formed as a stack of layers. In the illustrated embodiment, the stack includes a layer that forms a first photo-acoustic conversion region C102. A non-absorbing layer may be used between the optical waveguide C16 and the first photo-acoustic conversion region C102. On top of the first photo-acoustic conversion region, the stack includes a second layer which forms the intermediate region C112. On top of the intermediate region C112, the stack includes a layer that forms a second photo-acoustic conversion region C104. In the illustrated embodiment, the dimensions of the first and second photo-acoustic conversion regions C102, C104 in the direction perpendicular to the surface of substrate C22 are the same. It is noted, however, that this is not required. Furthermore, it is noted that in other embodiments the device C10 may comprise more than two photo-acoustic conversion regions. Further, parts of the intermediate layers may also be a void area, or a cavity.

Although the figure shows a grating C26, it is noted that instead of a grating coupling, other means of coupling may be used, such as a mirror, a reflecting facet etc. Although FIG. 18 displays a single grating C26, it is noted that such coupling structures C26 may also be provided at other locations along the waveguide.

The functioning of the device shown in FIG. 19 is similar to the functioning of the device shown in FIG. 18.

Direction Dependent Acoustic Radiation Patterns

FIGS. 20(a) and 20(b) show cross-sections of another embodiment of the photo-acoustic emitter device wherein the first and second photo-acoustic conversion regions C102, C104 are distinct at least because they have different diameters. In the illustrated embodiment no intermediate region is used between the first and second photo-acoustic conversion region C102, C104, but in another embodiment an intermediate region may be used. The device shown in FIG. 20(a) includes an optical fiber used as an optical waveguide C16. The output of the optical fiber is directly coupled to a light-to-sound conversion structure. The illustrated light-to-sound conversion structure includes a first photo-acoustic conversion region C102 and second photo-acoustic conversion region C104 of light-absorbing material, that are arranged successively in a light transmission path C106 along which light travels from the optical fiber C16 to the first photo-acoustic conversion region C102 and subsequently the second photo-acoustic conversion region C104. The size of an area of a cross-section of the second photo-acoustic conversion region C104 with a plane perpendicular to the light-transmission path (e.g. its width) is smaller than the size (e.g. width) of the area of a cross-section of the first photo-acoustic conversion region C102 parallel to such a plane. The cross-section area may be circular for example. Selection of the sizes and/or shapes of the cross-section areas may be used to construct a desired direction dependent pattern of sound radiation. The size of the cross-section area of a sound radiating region, such as first or second photo-acoustic conversion region C102, C104, affects the direction dependence of the intensity of the radiated sound. The larger the area compared to the wavelength of the sound, the more directional the sound radiation pattern. When the cross-section area of first photo-acoustic conversion region C102 is larger than that of second photo-acoustic conversion region C104, the sound radiation pattern due to first photo-acoustic conversion region C102 will be more directional than that of second photo-acoustic conversion region C104.

The size of the cross-section area of the second photo-acoustic conversion region C104 may be selected so that a substantially omnidirectional sound radiation pattern is realized form this photo-acoustic conversion region. The size of the cross-section area of the first photo-acoustic conversion region C102 may be selected so that a more directional sound radiation pattern is realized form this photo-acoustic conversion region. The device shown in FIG. 20(b) is similar to the device shown in FIG. 20(a). Instead of an optical waveguide C16 formed by an optical fiber, the device includes an optical waveguide C16 arranged on a planar substrate C22. The waveguide C16 is provided with a grating coupler C26 for coupling light out of the optical waveguide C16. Above waveguide C16 at grating coupling C26 a stack of a first and second photo-acoustic conversion region C102, C104 is arranged. The cross-section area size of the second photo-acoustic conversion region C104 is smaller than the cross-section area size of the first photo-acoustic conversion region C102. The first and second photo-acoustic conversion region C102, C104 may be part of respective layers that further include non-absorbing regions C102a, C104a. A light pulse travelling through the waveguide C16, and on through the first and second photo-acoustic conversion region C102, C104 via the grating coupling C26, will generate a selected spatial direction dependent acoustic radiation pattern.

Although the figure shows a grating C26, it is noted that instead of a grating coupling, other means of coupling may be used, such as a mirror, a reflecting facet etc.

It should be noted that the planar configuration of the photo acoustic converter as described in FIG. 20b in this embodiment is ideally suited to fabricate arbitrary emitter shapes for any application, to obtain specific emission patterns. When a fiber-based implementation is used instead of the planar configuration, it is difficult to use non-circular cross sections.

Spectral Shaping

Figure 21:
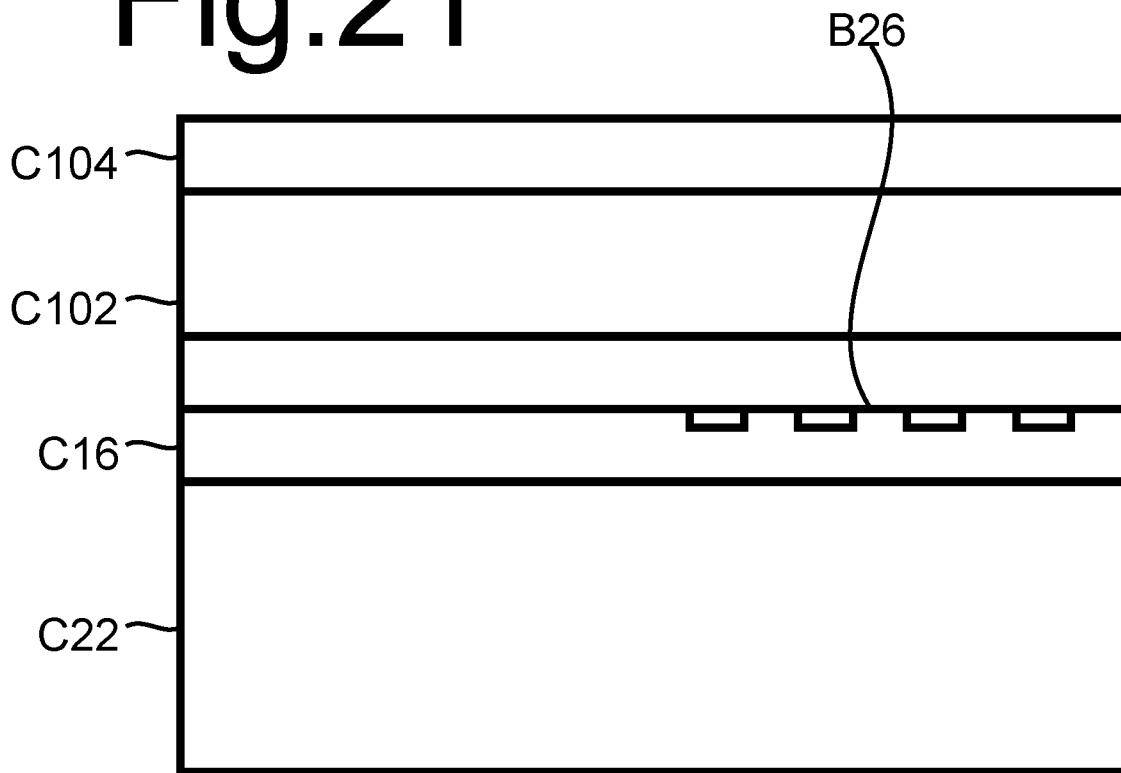
FIG. 21 shows a photo-acoustic transmitter with layers of different height

FIG. 21 shows a further embodiment of a photo-acoustic emitter device. An embodiment with an optical waveguide on a substrate is shown, but it should be appreciated that, mutatis mutandis, it may also be implemented using an optical fiber as waveguide instead. The illustrated device includes a waveguide C16 that is arranged on top of a planar substrate C22. The device comprises a coupling structure C26 for locally coupling light that travels in the waveguide out of the waveguide, in a direction perpendicular to the substrate C22. In the illustrated embodiment, the coupling structure is a grating C26, but other coupling means such as a mirror or a facet may be used. The coupling directs part or all of the light travelling through the waveguide C16 toward the light-to-sound conversion structure arranged on top of the waveguide C16 and substrate C22.

The light-to-sound conversion structure comprises a first and second light-absorbing layer, which form a first and second photo-acoustic conversion region C102, C104 of light absorbing material. A transparent layer may be included between the first light-absorbing layer C102 and the waveguide C16 and/or substrate C22. The device defines a light transmission path through the optical waveguide, the first photo-acoustic conversion region C102 and the second photo-acoustic conversion region C104. The second photo-acoustic conversion region C104 has a layer thickness that is smaller than the layer thickness of the first photo-acoustic conversion region C102.

Acoustic waves generated in the second layer of light-absorbing material have a smaller acoustic wavelength than the acoustic waves generated in the first layer of light-absorbing material. It is noted that in addition to selecting the wavelength, one may also tune the amplitude of the acoustic waves generated in the first and second layer of light-absorbing material. For example, the first photo-acoustic conversion region may have a higher absorption coefficient than the second photo-acoustic conversion region, or the other way around.

As a result of the different layer thicknesses, the first photo-acoustic conversion region C102 and the second photo-acoustic conversion regions generate sound with different acoustic spectra in response to light pulses. The larger the thickness, the lower the acoustic frequency band of the spectrum. The use of different materials in the photo-acoustic conversion regions makes it possible to select between the spectra by selecting the wavelength of the light an acoustic wave with a specific acoustic wavelength spectrum.

Control by Means of Optical Wavelength Selection

Figure 22:
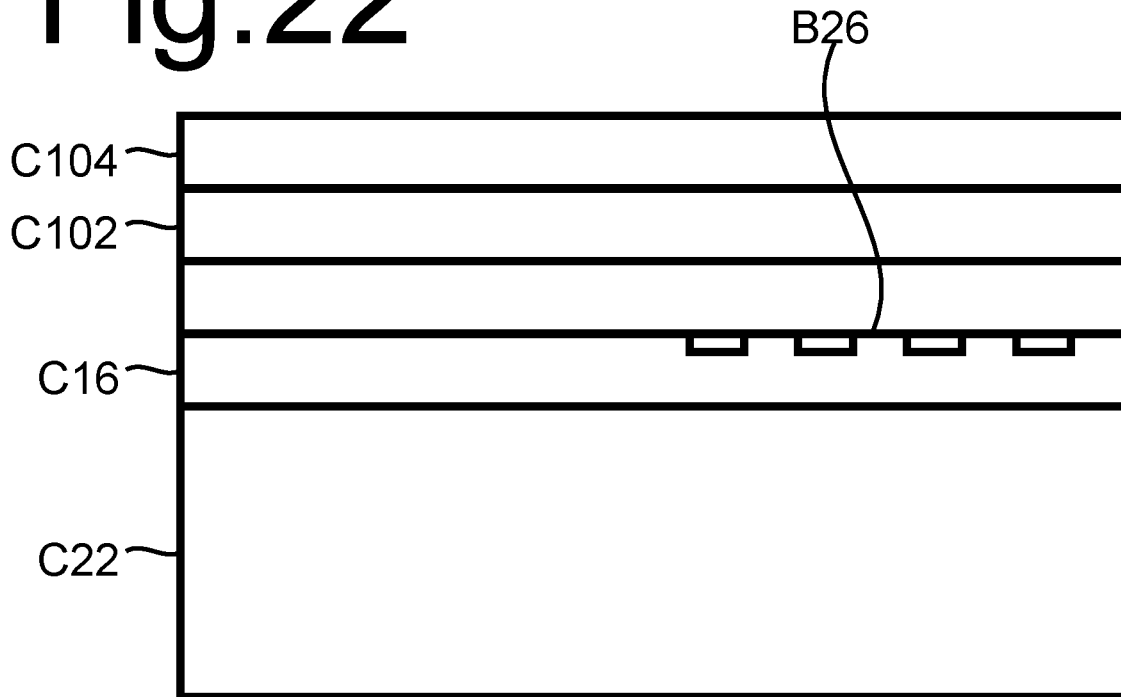
FIG. 22 shows a photo-acoustic transmitter using layers absorbing different optical wavelength with layers of different height

FIG. 22 shows an embodiment of a photo-acoustic emitter device. The illustrated device includes a waveguide C16 on a planar substrate C22. On top of the waveguide C16 a light-to-sound conversion structure is provided. The conversion structure comprises a first layer of light-absorbing material and a second layer on light-absorbing material forming a first and second photo-acoustic conversion region respectively. The material of the first photo-acoustic conversion region C102 is selected to absorb light at a first optical wavelength and to be substantially transparent at a second optical wavelength. The second photo-acoustic conversion region C104 is arranged on top of the first photo-acoustic conversion region C102. The material of the second photo-acoustic conversion region C104 is selected to absorb light at the second optical wavelength. Preferably, the material of the second photo-acoustic conversion region is selected to be substantially transparent at the first optical wavelength.

In operation, light travelling through the optical waveguide is locally coupled out of the waveguide C16. In the shown embodiment, light is coupled out of the waveguide towards the first and second layer using a grating coupling C26. However, one can also use an etched mirror or facet.

The illustrated device allows use of wavelength multiplexing. Specifically, when an optical pulse is fed through the waveguide C16 with the first optical wavelength an acoustic wave will be generated only in the first photo-acoustic conversion region C102. Instead, if an optical pulse is fed to the waveguide C16 with the second optical wavelength, an acoustic wave is generated only in the second photo-acoustic conversion region C104. Hence, the device allows for optical wavelength based multiplexing. In particular, when the first photo-acoustic conversion region C102 and the second photo-acoustic conversion region C104 have different layer thicknesses, it is possible to selectively generate an acoustic wave with a specific acoustic wavelength spectrum. If most of the light at the first optical wavelength is absorbed in the first photo-acoustic conversion region C102, the second photo-acoustic conversion region C104 does not need to be transparent at the first optical wavelength.

Further, it is noted that the wavelength dependent multiplexing may also be used in a different configuration. For example, in an embodiment an optical waveguide C16 is arranged on a substrate C22, with coupling structures at two or more sections of the optical waveguide C16. In this embodiment a first photo-acoustic conversion region of light-absorbing material that is transparent at the second wavelength and absorbs light at the first wavelength may be arranged on a first set of one or more sections, while a second photo-acoustic conversion region may be arranged on a second set of one or more sections of light-absorbing material, that is transparent at the first optical wavelength and absorbs light at the second optical wavelength. Thus the location where the sound is generated may be selected by selecting the optical wavelength of the light pulse.

Similarly, a plurality of optical waveguide C16, fed from different outputs of an optical splitter may be used. For example two or more waveguides C16 may be used. Each of the multiple waveguides may be routed to a corresponding photo-acoustic conversion region of light-absorbing material, of which the first one absorbs light at a first optical wavelength and is transparent at a second optical wavelength, whereas the second photo-acoustic conversion region is transparent at the first optical wavelength and absorbs light at the second optical wavelength.

Although in the embodiments the two layers have identical lateral extensions, the lateral extension of one of the layers, for example the second photo-acoustic conversion region C104, may be limited. This makes it possible to select a directional pattern of the acoustic wave, which is generated in the first photo-acoustic conversion region C102 by an optical pulse with the first optical wavelength, and to create an acoustic wave with a different direction pattern, which is generated in the second photo-acoustic conversion region C104 by an optical pulse with the second optical wavelength.

Alternatively, one may provide a single waveguide that is split into multiple waveguides, for example two optical fibers. The first fiber may be provided with a Fiber Bragg grating at the second optical wavelength, and the second fiber may be provided with a Fiber Bragg grating at the first optical wavelength. The first and second optical fiber may then be optically coupled to a first and second photo-acoustic conversion region. Then, a light pulse with the first optical wavelength will generate an acoustic wave only in the first photo-acoustic conversion region, as the light pulse will be reflected in the second optical fiber. Similarly, a light pulse with the second optical wavelength will generate an acoustic wave only in the second photo-acoustic conversion region, as the light pulse will be reflected in the first optical fiber. Hence, in this alternative embodiment it is not required that the optical absorption properties are different in the first and second photo-acoustic conversion region. In particular, the first and second photo-acoustic conversion region may be even be made of the same materials.

By selecting the shape and size of the first and second photo-acoustic conversion regions to which the first and second optical fiber are routed one can tune the acoustic wavelengths and shape of the acoustic wavefronts.

The illustrated embodiments comprise a first and a second photo-acoustic conversion region. It is understood that embodiments with more than two photo-acoustic conversion regions can also take advantage of the above. For example, one may arrange three layers of light-absorbing material on top of the waveguide instead of two layers. Then, it can be advantageous that the first layer absorbs light at a first optical wavelength and is transparent at a second and third optical wavelength, the second layer absorbs light at the second optical wavelength and is transparent at the first and third optical wavelength, and the third layer absorbs light at the third optical wavelength and is transparent at the first and second optical wavelength.

Similarly, for the alternative embodiment that employs fiber Bragg gratings, one may also split the waveguide into more than two optical fibers. For example, the waveguide may be split into three optical fibers. Then, the first, second and third fiber may each be provided with two FBGs in series. The first fiber may have one FBG at a second optical wavelength and another FBG at a third optical wavelength, the second fiber may have one FBG at a first optical wavelength and another at the third optical wavelength, and the third fiber may have one FBG at the first optical wavelength and another at the second optical wavelength. Then one can selectively excite a photo-acoustic conversion region that is connected to the first, second and third fiber with a light pulse at the first, second and third optical wavelength, respectively.

Figure 23:
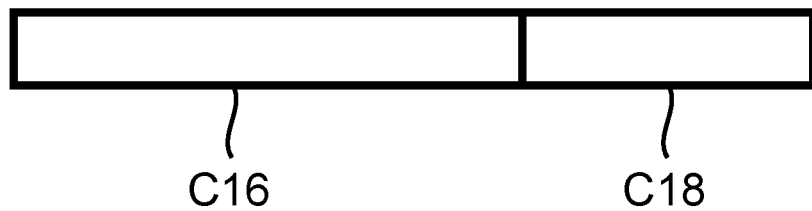
FIG. 23 shows a photo-acoustic transmitter that uses penetration depths

FIG. 23 shows an embodiment of a photo-acoustic emitter device C10. The shown device A10 includes an optical fiber C16 that is coupled to a photo-acoustic conversion region C18. The light-to-sound converter C18 is formed entirely of a material with an optical wavelength dependent light absorption coefficient. The length of the photo-acoustic conversion region C18 is so large that for at least some optical wavelengths substantially all of the light intensity at that optical wavelength (e.g. at least ninety percent) will be absorbed before the light reaches the end of photo-acoustic conversion region C18.

This make it possible to use selection of the optical wavelength to control the effective length of the photo-acoustic conversion regions in which sound is generated and hence the acoustic spectrum.

Evanescent Coupling to Embedded a Photo-Acoustic Conversion Shapes

Figure 24:
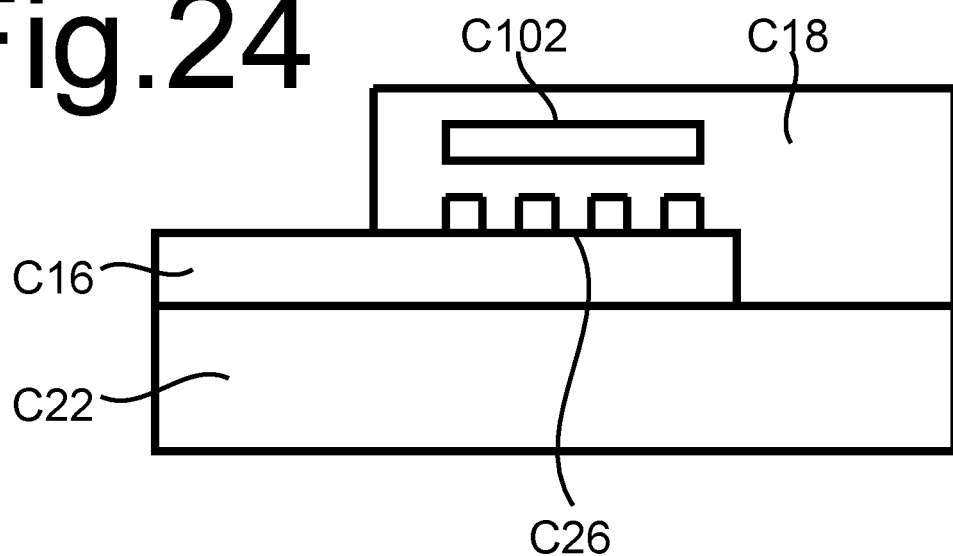
FIG. 24-25 show a photo-acoustic transmitter that uses evanescent coupling

FIG. 24 shows a side-view of an embodiment of a photo-acoustic emitter device, with an optical waveguide C16 arranged on top of a substrate C22 and a coupling structure C26 on the optical waveguide C16. A transparent body C18 is arranged over the optical waveguide C16 and the substrate surface C22. A photo-acoustic conversion region C102 of light-absorbing material C102 is embedded in the body C18

In operation light supplied to the waveguide C16 is coupled out of the waveguide into body C18 by coupling structure C26.

The embedded photo-acoustic conversion region C102 of light-absorbing material may be box-shaped. In particular, the thickness of the photo-acoustic conversion region C102 of light-absorbing material may be smaller than the lateral extension of the photo-acoustic conversion region. Thereby, it is achieved that if the photo-acoustic conversion region expands due heating by an incident light pulse originating from the underlying waveguide, an acoustic pulse is generated with a relatively planar wavefront. Instead, if the shape of the photo-acoustic conversion region C102 of light-absorbing material is closer to a spherical shape a more spherical wavefront would be created.

Figure 25:
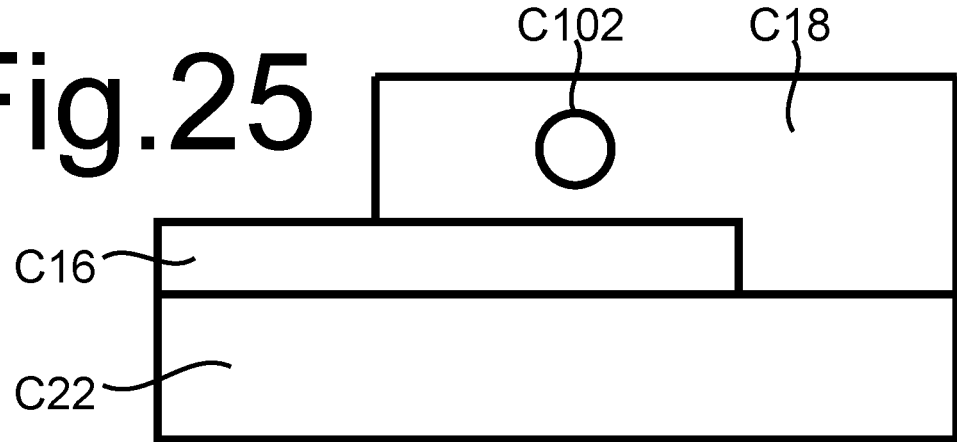

FIG. 25 shows an embodiment wherein evanescent light coupling is used between an optical waveguide C16 and a photo-acoustic conversion region C102 of light-absorbing material. The device includes a substrate C22, a waveguide C16 on the substrate C22, a body C18 of optically transparent material and a photo-acoustic conversion region C102 of light-absorbing material embedded in the body C18. No specific coupling is provided. The material of body C102 has a lower index of refraction than the material of the optical waveguide C16.

Because of the absence of a specific coupling is provided, light travelling from the waveguide C16 only creates an evanescent field in body C18. The evanescent field reaches to the photo-acoustic conversion region C102 of light-absorbing material, where it can be used to generated sound.

The shape of the photo-acoustic conversion region may be cylindrical for example. The longitudinal axis of the cylinder-shaped photo-acoustic conversion region may be parallel with the substrate surface. When the photo-acoustic conversion region expands, for example due to heating by evanescent light originating from the underlying waveguide C16, an acoustic wave is created with a cylindrical wave front. By using alternative orientations and/or shapes, different acoustic wave fronts can be created.

The invention claimed is:

1. A photonic integrated device for converting a light signal into sound, the photonic integrated device comprising:
   a substrate having a substrate surface;
   an optical waveguide on the substrate surface;
   a photo-acoustic conversion body integrated on the device, the photo-acoustic conversion body comprising at least one volume of fractionally light absorbing material or formed entirely of fractionally light absorbing material, wherein the photo-acoustic conversion body is configured as a dedicated solid structure, and wherein a width of the photo-acoustic conversion body is greater than a width of the optical waveguide; and
   a coupling structure for enhancing distribution of light from the optical waveguide over the photo-acoustic conversion body, wherein the coupling structure is configured to manipulate light to interact with the photo-acoustic conversion body.

2. The photonic integrated device according to claim 1, wherein the coupling structure is further configured to transmit light from the optical waveguide through the photo-acoustic conversion body in a direction transverse to the substrate surface.

3. The photonic integrated device according to claim 2, wherein the coupling structure comprises at least one of a grating on a part of the optical waveguide, a mirror on the optical waveguide, and a facet of the optical waveguide.

4. The photonic integrated device according to claim 2, wherein the optical waveguide extends along an optical path in a plane parallel to the substrate surface, adjacent to a top or bottom surface of the photo-acoustic conversion body, or within the photo-acoustic conversion body, wherein a shape of the optical path is configured to guide the light successively along positions distributed over two dimensions in a two-dimensional area in said plane, the device comprising a plurality of coupling structures configured to direct light from the optical waveguide into the substrate surface at different locations along the optical path.

5. The photonic integrated device according to claim 4, wherein the shape of the optical path in the plane parallel to the substrate surface is an inward spiral.

6. The photonic integrated device according to claim 2, comprising:
   an optical splitter with an input coupled to the optical waveguide;
   a plurality of coupling structures at different locations on top of or under the photo-acoustic conversion body; and
   a plurality of intermediate optical waveguides on top of or underneath the photo-acoustic conversion body, coupled between outputs of the splitter and respective ones of the plurality of coupling structures.

7. The photonic integrated device according to claim 2, wherein the photo-acoustic conversion body comprises a plurality of distinct layers of fractionally light absorbing material at different heights within its height in the direction perpendicular to the substrate surface, the layers being distinguished by at least one of:
   an intermediate layer in the photo-acoustic conversion body, separating the layers, a material of the intermediate layer having a lower light absorption coefficient than the material or materials of the layers of fractionally light absorbing material;
   a difference between cross-section area size and/or shapes of the layers of fractionally light absorbing material of cross-sections with virtual planes parallel to the surface of the substrate;
   a difference between heights of the layers of fractionally light absorbing material;
   a difference between the optical absorption coefficients of materials of the layers of fractionally light absorbing material, or a different optical wavelength dependence of these optical absorption coefficients.

8. The photonic integrated device according to claim 1, wherein the optical waveguide is configured to transmit light into the photo-acoustic conversion body in a direction or directions parallel to the substrate surface.

9. The photonic integrated device according to claim 8, wherein the photo-acoustic conversion body is configured to provide for multiple internal reflections of light from the optical waveguide within the photo-acoustic conversion body, in a virtual plane parallel to the substrate surface.

10. The photonic integrated device according to claim 9, wherein a cross-section with said virtual plane parallel to the substrate surface is circular.

11. The photonic integrated device according to claim 8, wherein the photo-acoustic conversion body on the substrate forms a further optical waveguide coupled to the optical waveguide, the further optical waveguide containing the fractionally light absorbing material and extending in an optical path in a plane parallel to the substrate surface, wherein a shape of the optical path is configured to guide the light along positions distributed over two dimensions in a two-dimensional area in said plane.

12. The photonic integrated device according to claim 11, wherein the shape of the optical path in the plane parallel to the substrate surface is an inward spiral.

13. The photonic integrated device according to claim 8, comprising an optical splitter on the substrate, a plurality of optical waveguides on said substrate surface, coupled between outputs of the splitter and respective different locations along a circumference of the photo-acoustic conversion body in said plane.

14. The photonic integrated device according to claim 8, wherein a first part of the optical waveguide has a constant width on the substrate that is smaller than a width of the side surface of the photo-acoustic conversion body, the optical waveguide comprising a widening waveguide part between the first part of the optical waveguide and the photo-acoustic conversion body.

15. The photonic integrated device according to claim 1, wherein said coupling structure is configured to couple evanescent light into the photo-acoustic conversion body.

16. The photonic integrated device according to claim 15, comprising an optical splitter having an input coupled to the optical waveguides and a plurality of outputs, a plurality of parallel optical waveguides at a pitch so that evanescent fields from the parallel optical waveguides overlap, each of the plurality of parallel optical waveguides coupled to a respective one of the outputs of the optical splitter.

17. The photonic integrated device according to claim 15, wherein said coupling structure comprises one or more bends in the optical waveguide configured to provide for evanescent coupling between the optical waveguide and the photo-acoustic conversion body at the one or more bends.

18. The photonic integrated device according to claim 15, wherein the photo-acoustic conversion body is embedded in a volume of optically transparent material that comprises a part between the photo-acoustic conversion body and the optical waveguide, the photo-acoustic conversion body lying within a distance from the optical waveguide, the distance being so small as to allow for an evanescent light coupling between the optical waveguide and the photo-acoustic conversion body.

* * * * *